(12) United States Patent
Lehmann et al.

(10) Patent No.: US 8,880,422 B1
(45) Date of Patent: *Nov. 4, 2014

(54) ENERGY HIGH PERFORMANCE CAPABILITY ASSESSMENT

(75) Inventors: Silke Lehmann, Brokestedt (DE); Andrew Pietro Pincott, Walnut Tree Cottage (GB); Jose Maria Botte, Lisbon (PT)

(73) Assignee: Accenture Global Services Limited, Dublin (IE)

( * ) Notice: Subject to any disclaimer, the term of this patent is extended or adjusted under 35 U.S.C. 154(b) by 921 days.

This patent is subject to a terminal disclaimer.

(21) Appl. No.: 12/710,662

(22) Filed: Feb. 23, 2010

Related U.S. Application Data

(60) Provisional application No. 61/154,945, filed on Feb. 24, 2009.

(51) Int. Cl.
 *G06Q 10/00* (2012.01)
 *G06Q 10/06* (2012.01)

(52) U.S. Cl.
 CPC ........ *G06Q 10/0639* (2013.01); *G06Q 10/0637* (2013.01); *G06Q 10/06393* (2013.01)
 USPC .......................... 705/7.38; 705/7.36; 705/7.39

(58) Field of Classification Search
 CPC .......... G06Q 10/0637; G06Q 10/0639; G06Q 10/06393
 USPC ....................... 705/7.36, 7.38, 7.39
 See application file for complete search history.

(56) References Cited

U.S. PATENT DOCUMENTS

| | | | |
|---|---|---|---|
| 6,256,773 B1 | 7/2001 | Bowman-Amuah | |
| 6,324,647 B1 | 11/2001 | Bowman-Amuah | |
| 6,370,573 B1 | 4/2002 | Bowman-Amuah | |
| 6,601,233 B1 | 7/2003 | Underwood | |
| 6,957,186 B1 | 10/2005 | Guheen et al. | |
| 2002/0035495 A1* | 3/2002 | Spira et al. | 705/7 |
| 2003/0083912 A1* | 5/2003 | Covington et al. | 705/7 |
| 2003/0110067 A1* | 6/2003 | Miller et al. | 705/8 |
| 2004/0054567 A1* | 3/2004 | Bubner | 705/7 |
| 2004/0098299 A1* | 5/2004 | Ligon et al. | 705/10 |
| 2007/0050239 A1* | 3/2007 | Caneva | 705/11 |

OTHER PUBLICATIONS

Naughton, Michael J. et al., Assessment, planning define capabilities, design for gasoline blending project. Oil & Gas Journal 103.6 (Feb. 14, 2005): 50-53.*

Brochure, "High Performance Acceleration: Global Retail Process Model," Accenture, High Performance Delivered, 2007.

Handbook, Software Engineering Institute, "A Description of the Systems Engineering Capability Maturity Model Appraisal Method Version 1.1," Mar. 1996.

(Continued)

*Primary Examiner* — Timothy Padot
(74) *Attorney, Agent, or Firm* — Brinks Gilson & Lione

(57) ABSTRACT

A high performance capability assessment model helps an energy industry business meet the challenges of the global marketplace. As a result, the energy industry business can achieve the clarity, consistency, and well-defined execution of core processes that reduce inefficiencies and waste that result from unnecessary process complexity and exceptions. In addition, the high performance capability assessment model helps the energy industry business to identify specific areas in which improvements may be made and understand how to make the improvements, and establishes levels of capability along the way to reaching an ultimate capability goal.

18 Claims, 12 Drawing Sheets

(56) References Cited

OTHER PUBLICATIONS

Keith A. Heston, "Achieving Delivery Excellence Using the Capability Maturity Model Integration," *Accenture, High Performance Delivered*, 2006.
Report, Software Engineering Institute, "A Systems Engineering Capability Maturity Model, Version 1.1.," Nov. 1995.
Walker Royce, "CMM vs. CMMI: From Conventional to Modern Software Management," *The Rational Edge*, 2002.
U.S. Appl. No. 11/823,112, filed Jun. 25, 2007.
U.S. Appl. No. 12/124,010, filed May 20, 2008.
U.S. Appl. No. 12/129,080, filed May 29, 2008.
U.S. Appl. No. 61/086,927, filed Aug. 7, 2008.
U.S. Appl. No. 12/194,793, filed Aug. 20, 2008.
U.S. Appl. No. 61/092,225, filed Aug. 27, 2008.
U.S. Appl. No. 12/324,150, filed Nov. 26, 2008.
U.S. Appl. No. 61/154,832, filed Feb. 24, 2009.
U.S. Appl. No. 61/154,945, filed Feb. 24, 2009.
U.S. Appl. No. 61/164,640, filed Mar. 30, 2009.
U.S. Appl. No. 61/164,618, filed Mar. 30, 2009.
U.S. Appl. No. 12/427,201, filed Apr. 21, 2009.
U.S. Appl. No. 12/471,767, filed May 26, 2009.
U.S. Appl. No. 12/479,310, filed Jun. 5, 2009.
U.S. Appl. No. 12/548,673, filed Aug. 27, 2009.
U.S. Appl. No. 12/701,914, filed Feb. 8, 2010.
U.S. Appl. No. 12/710,900, filed Feb. 23, 2010.
U.S. Appl. No. 12/713,647, filed Feb. 26, 2010.
U.S. Appl. No. 12/713,597, filed Feb. 26, 2010.
Non-Final Office Action dated Apr. 28, 2011, issued in related U.S. Appl. No. 12/129,080.

\* cited by examiner

ENERGY HIGH PERFORMANCE CAPABILITY ASSESSMENT

CROSS-REFERENCE TO RELATED APPLICATIONS

This application claims the benefit of priority from Provisional Application Ser. No. 61/154,945, entitled Energy High Performance Capability Assessment, filed Feb. 24, 2009, and which is hereby incorporated by reference in its entirety.

BACKGROUND OF THE INVENTION

1. Technical Field

This disclosure concerns a system and method to identify the performance of an organization on a scale of mastery across representative capabilities of the organization's industry. In particular, this disclosure relates to an efficient and cost effective way to assess the performance capability level of key assessment areas within the processes of an energy-based organization, such as an oil and gas organization 2. Background Information Modern energy organizations operate in an increasingly challenging environment. To survive, energy organizations must adapt to this environment and execute in a clear, consistent, and efficient manner. Furthermore, the regularity requirements and resource management challenges of energy businesses greatly increase the complexity and difficulty of surviving on a day-to-day basis.

Despite the need for an energy organization to meet the challenges of the global marketplace, it is still often the case that the business lacks clarity, consistency, and well-defined execution of its core processes. These shortcomings severely constrain the business, and lead directly to inefficiencies and waste due to unnecessary complexity, process exceptions, and customer dissatisfaction. At the same time, it can be very difficult to identify specific processes to which improvements may be made, either because the business itself does not have the expertise to identify the processes or because the complexities of the business frustrate attempts to clearly delineate the processes to be improved.

Even if the energy business, on its own, could identify one of the many processes that it needs to improve, the business would not necessarily know how to improve the process or be able to identify a concrete and measurable improvement goal. Another difficulty exists in determining whether there are any intermediate goals that should be reached along the way. As energy businesses struggle to meet the demands of the modern economic landscape, they fail to identify opportunities for maximizing compliance and margin improvement, category expansion, multi-channel execution, selling performance, customer satisfaction improvement, and to reach other important goals.

Therefore, a need exists for an efficient and effective system and method to assess the performance level of key assessment areas within the processes of an energy-based organization.

SUMMARY

A high performance capability assessment (HPCA) model helps energy businesses meet the challenges of the global marketplace by defining a scale of performance mastery along which the current practices of the business may be located. The HPCA model accelerates the discovery of process and performance gaps within business operations. In addition, the HPCA model also helps the business to identify specific areas in which improvements may be made, how to make the improvements, and how to establish performance measures during the course of attempting to achieve an ultimate goal. As a result, the business can achieve the clarity, consistency, and well-defined execution of core processes that maximize the operating budget for optimum outcomes.

The HPCA model includes a key factor dimension and a performance mastery scale dimension. The performance mastery scale dimension defines multiple mastery levels. The performance mastery levels form a scale of increasing organizational performance. The scale includes a 'Basic' mastery level, a 'Progressive' mastery level, a 'Leading' mastery level, and an 'Emerging' mastery level along a horizontal axis, and each of the four mastery levels in some capability areas may be further defined with three additional aspects, namely, procedures, people, and technology. Each performance mastery level includes criteria specific to a corresponding key assessment area. Each key assessment area identifies some aspect of a capability of an energy business.

A business capability can be defined as a bundle of closely integrated skills, knowledge, technologies, and cumulative learning that is exercised through a set of processes and that collectively represents an organization's ability to create value by producing outcomes and results. Capability area does not represent a delineation of organizational responsibilities as the business outcomes of a capability may be the result of a number of cross-functional teams. Capabilities of an energy business may be grouped into platforms. For example, the HPCA model groups the capabilities of the energy industry into three high-level platforms corresponding to an integrated oil and gas industry, which platforms may include a plan and manage enterprise platform, an operational business platform, and a support services platform. Platforms may include sub-platforms, as well as capabilities. For example, the operational business platform may include sub-platforms for exploration and production, gas, refining, marketing operations, hydrocarbon supply chain, and non-hydrocarbon supply chain, where each sub-platform may contain the capabilities.

The key factor dimension establishes a set of key assessment areas in which to analyze the capabilities of a business. Key assessment areas include performance capability criteria. Performance capability criteria populate the performance capability assessment model. The performance capability criteria may be specific to any one of many different business capabilities. For example, the exploration and production sub-platform (corresponding to the operational business platform) includes performance capability criteria for exploration and appraisal, development, production, market and exploration, and operations support, at each of the capability levels along the performance capability scale dimension. Any number of performance capability assessment models and performance capability criteria may be defined and stored in a capability detail pool for subsequent retrieval and application to a business under examination. Accordingly, the HPCA model provides a flexible and adaptive scale of performance capability against which business practices may be compared to ascertain where the capabilities of a business under examination fall along the scale.

Other systems, methods, features, and advantages will be, or will become, apparent to one with skill in the art upon examination of the following figures and detailed description. All such additional systems, methods, features, and advantages are included within this description, are within the scope of the invention, and are protected by the following claims.

BRIEF DESCRIPTION OF THE DRAWINGS

The energy industry high performance capability assessment model and system may be better understood with reference to the following drawings and description. The elements in the figures are not necessarily to scale, emphasis instead being placed upon illustrating the principles of the capability assessment techniques. In the figures, like-referenced numerals designate corresponding parts throughout the different views.

DETAILED DESCRIPTION OF THE PREFERRED EMBODIMENTS

Figure 1:
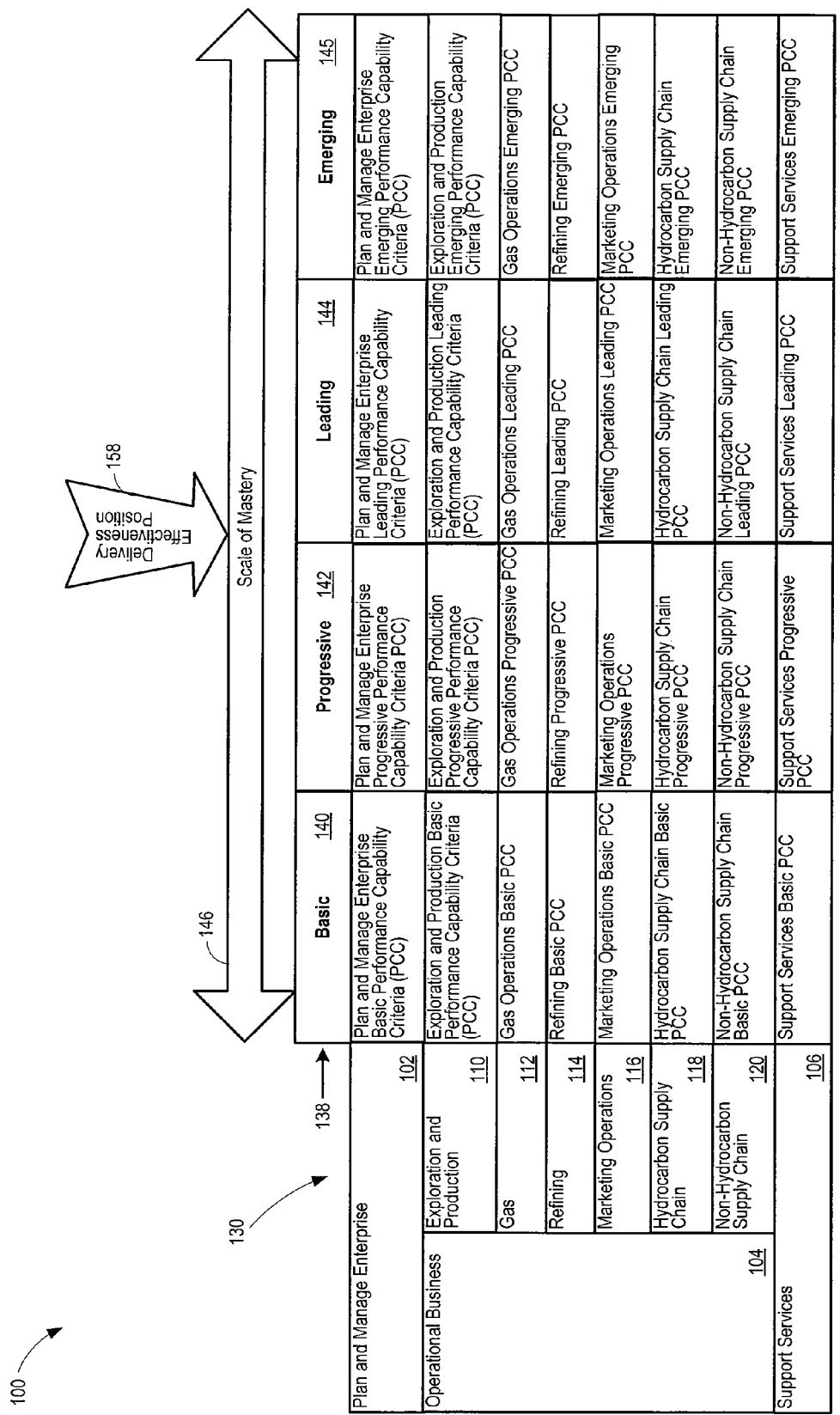
FIG. 1 shows a high performance capability assessment model with a performance scale of mastery and performance criteria shown for different capabilities.

FIG. 1 shows an energy high performance capability assessment (HPCA) model 100. The HPCA model 100 specifies three high-level platforms, including a plan and manage the enterprise platform 102, an operational business platform 104, and a support services platform 106. The operational business platform 104 may include sub-platforms, such as exploration and production 110, gas 112, refining 114, marketing operations 116, hydrocarbon supply chain 118, and non-hydrocarbon supply chain 120.

The HPCA model 100 is not limited to the form shown in FIG. 1. Instead, the HPCA model 100 may be adapted and modified to fill a wide variety of analysis roles. Additional, different, or fewer platforms may be used in other implementations, with each platform defining additional, different, or fewer capabilities. Each platform may include one or more multiple capabilities 130 for the various platforms or sub-platforms.

The HPCA model 100 establishes a multidimensional energy industry performance reference set that includes multiple key assessment performance levels 138, further described below in reference Tables 1-3. The performance levels 138 establish a scale of increasing effectiveness in delivery of each capability. The key assessment performance reference tables include a 'Basic' 140 delivery level, a 'Progressive' 142 delivery level, a 'Leading' 144 delivery level, and an 'Emerging' 145 delivery level. The performance levels establish a scale of mastery 146 along which current business practices may be located and identified with respect to any platform and capability within a platform according to an analysis of performance capability criteria (PCC). The capability under evaluation may be assigned the performance level 138 based on a delivery effectiveness position 158 along the scale of mastery 146.

The 'Basic' delivery level 140 specifies 'Basic' performance assessment criteria, the 'Progressive' delivery level 142 specifies 'Progressive' performance assessment criteria, the 'Leading' delivery level 144 specifies a 'Leading' performance assessment criteria, and the 'Emerging' delivery level 145 specifies 'Emerging' performance assessment criteria. The HPCA model 100 receives input data that specifies an energy business platform (e.g., an energy industry area) and an energy industry key assessment area for analysis. The HPCA model 100 searches the multidimensional energy industry performance reference set for a matching key assessment performance reference table that matches the energy business industry platform and corresponding industry capability within the platform and the energy industry key assessment area, and retrieves the matching key assessment performance reference table. The HPCA model 100 initiates analysis of the matching key assessment performance reference table to obtain a resultant performance assessment level for the energy industry key assessment area.

Tables 1-4 below provide an explanation of each of the capability delivery levels 140, 142, 144, and 145.

TABLE 1

'Basic' Delivery Level

| | |
|---|---|
| Description: | Capability mastery at a basic level indicates minimal evidence of proficiency or demonstration of this capability, the minimum to operate, typically highly manual operations, and likely increasing costs or a negative influence on revenue. |

TABLE 2

'Progressive' Delivery Level

| | |
|---|---|
| Description: | Capability mastery at a progressive level indicates an average proficiency or demonstration of this capability, with neutral effect on cost or revenue. |

TABLE 3

'Leading' Delivery Level

| | |
|---|---|
| Description: | Capability mastery at a leading level is more Leading than most energy companies. Likely industrialized or standardized to a high degree, competitive strength for the company, and strong influence on reducing costs or increasing revenue. |

TABLE 4

'Emerging' Delivery Level

| | |
|---|---|
| Description: | Capability mastery at an emerging level indicates proactively incorporating business and IT trends into the operation driving competitive advantage through process or technology leadership. |

For FIGS. 2-7, the capability under evaluation may be assigned a level of mastery 138 based on the business's position along the scale of mastery 146 (e.g., the 'basic,' 'progressive,' 'leading,' or 'emerging' delivery level). Performance criteria corresponding to the basic 140, progressive 142, leading 144, and emerging 145 performance levels populate the HPCA model 100. The performance criteria capture characteristics, and/or other features of the delivery of a capability at a particular performance level. Examples below illustrate performance criteria that provide analysis and benchmarking for energy organizations. The HPCA model 100 performance criteria provide a tool for determining where a platform and capability under examination falls along the scale of mastery 146.

For example, business consultants and business process engineers may interview an energy business or receive data about the business to determine, measure, or otherwise ascertain the characteristics, criteria, and other features of a particular capability implemented within the business. The consultants and engineers may compare the characteristics of the business to the performance criteria in the HPCA model 100 and arrive at an assessment level 138 for the capability under examination. In doing so, for example, the consultants and engineers may identify where the capability under examination falls in terms of the performance level for each key assessment area of a capability and determine an overall position on the scale of mastery 146 for the capability under examination. Performance criteria may populate the HPCA model 100 in whole or in part. Multiple high performance capability assessments may be collected and stored with the performance criteria for future retrieval and possible modification in a capability detail pool, discussed below.

Figure 2:
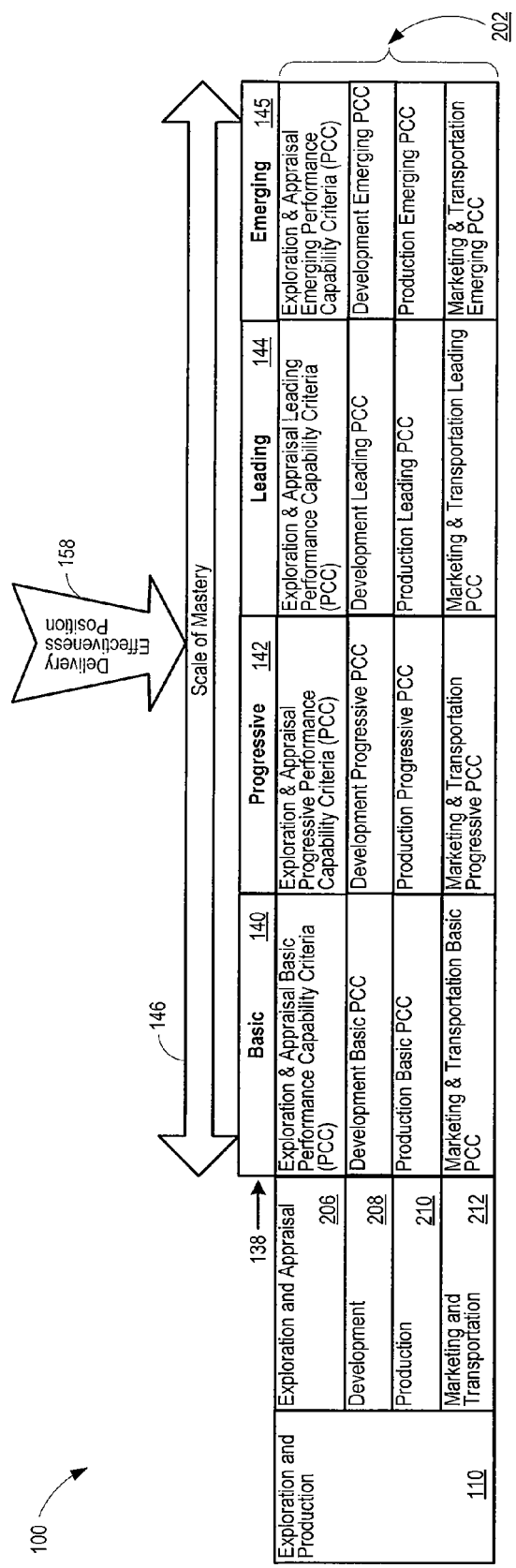
FIG. 2 shows a high performance capability assessment model with exploration and production capabilities shown.

FIG. 2 shows the exploration and production sub-platform 110 divided into respective capability areas 202. The exploration and production sub-platform 110 includes sub-platforms for exploration and appraisal 206, development 208, production 210, and marketing and transportation 212. Multiple capability descriptions may be shown for each platform or sub-platform.

Figure 3:
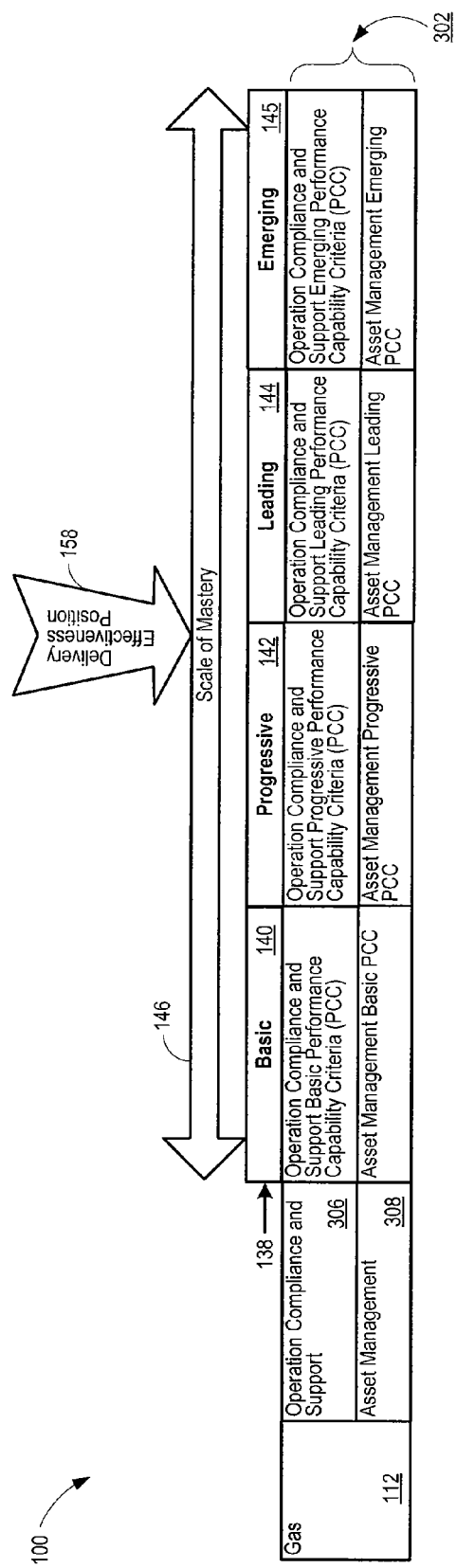
FIG. 3 shows a high performance capability assessment model with gas operations capabilities shown.

FIG. 3 shows the gas operations sub-platform 112 divided into respective capability areas 302. The gas operations sub-platform 112 includes sub-platforms for operation compliance and support 306, and asset management 308. Multiple capability descriptions may be shown for each platform or sub-platform.

Figure 4:
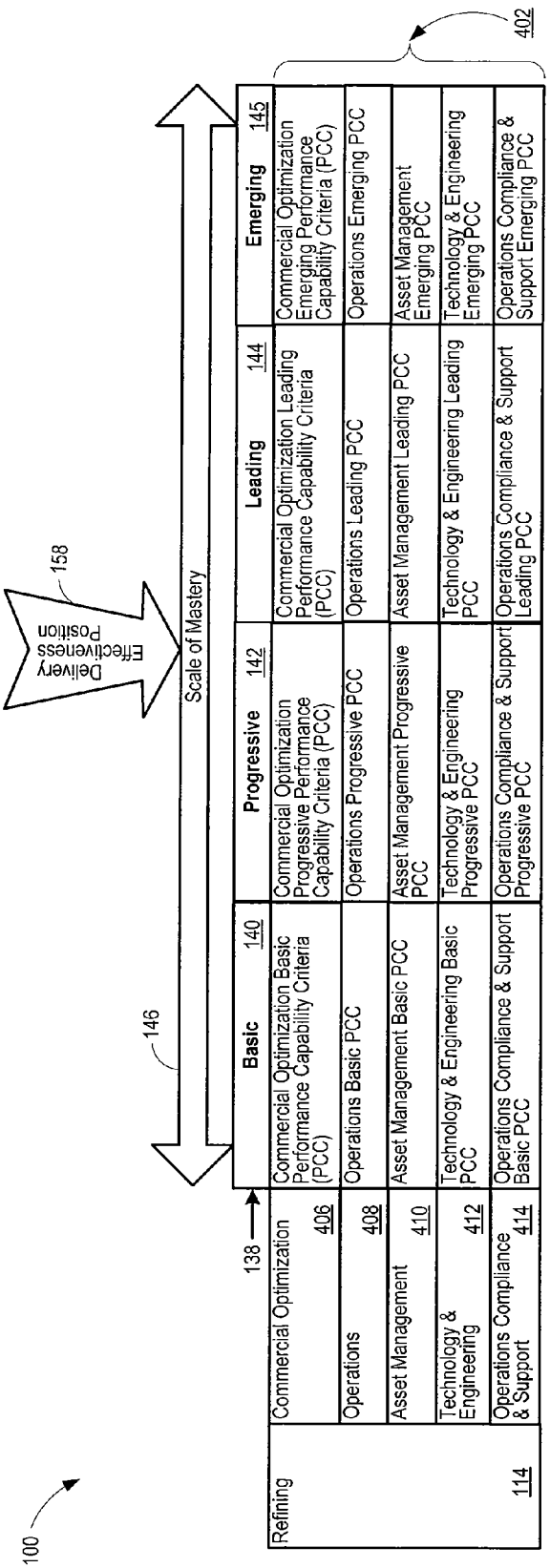
FIG. 4 shows a high performance capability assessment model with refining capabilities shown.

FIG. 4 shows the refining sub-platform 114 divided into respective capability areas 402. The refining sub-platform 114 includes sub-platforms for commercial optimization 406, operations 408, asset management 410, technology and engineering 412, and operations compliance and support 414. Multiple capability descriptions may be shown for each platform or sub-platform.

Figure 5:
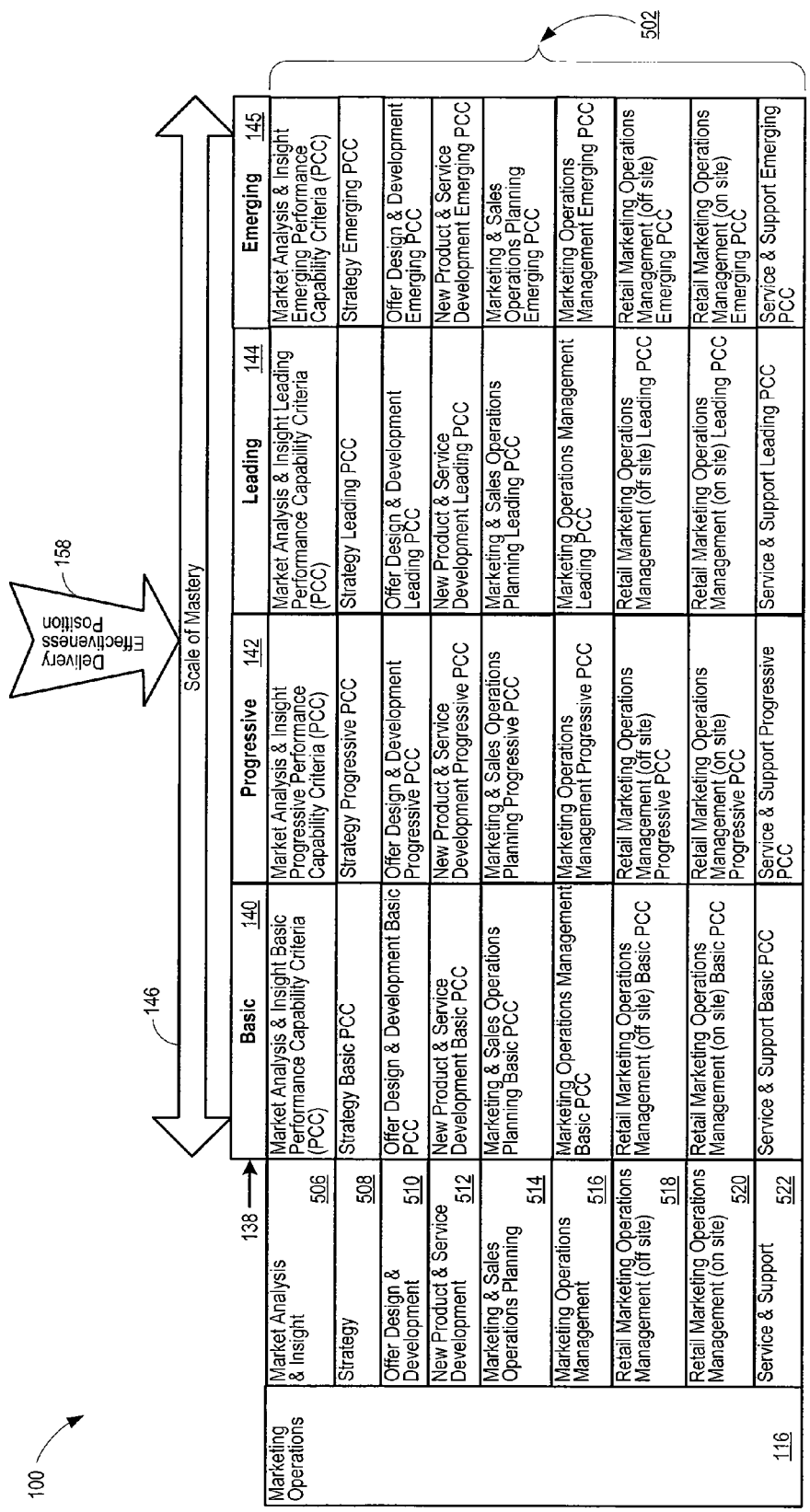
FIG. 5 shows a high performance capability assessment model with marketing operations capabilities shown.

FIG. 5 shows the marketing operations sub-platform 116 divided into respective capability areas 502. The marketing operations sub-platform 116 includes sub-platforms for market analysis and insight 506, strategy 508, offer design and development 510, new product and service development 512, marketing and sales operations planning 514, marketing operations management 516, retail marketing operations management (off site) 518, retail marketing operations management (on site) 520, and service and support 522. Multiple capability descriptions may be shown for each platform or sub-platform.

Figure 6:
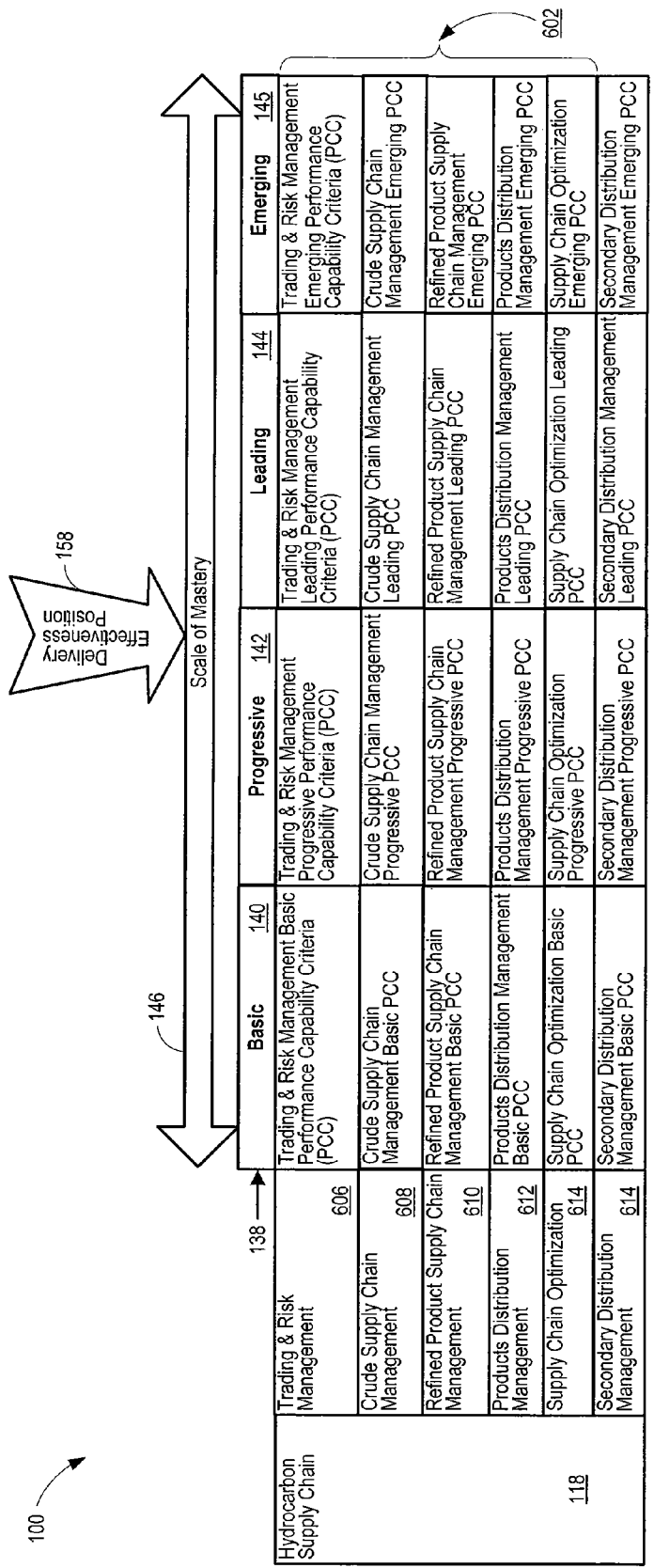
FIG. 6 shows a high performance capability assessment model with hydrocarbon supply chain capabilities shown.

FIG. 6 shows the hydrocarbon supply chain sub-platform 118 divided into respective capability areas 602. The hydrocarbon supply chain sub-platform 118 includes sub-platforms for trading and risk management 606, crude supply chain management 608, refined product supply chain management 610, products distribution management 612, supply chain optimization 614, and secondary distribution management 616. Multiple capability descriptions may be shown for each platform or sub-platform.

Figure 7:
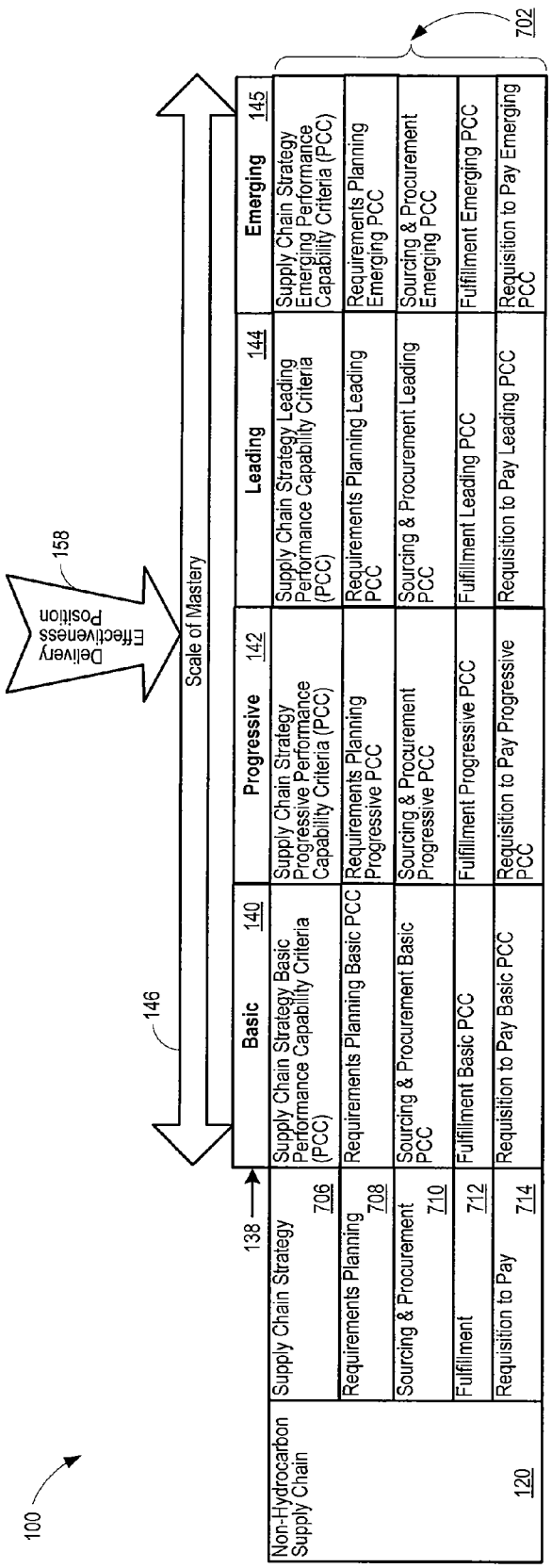
FIG. 7 shows a high performance capability assessment model with non-hydrocarbon supply chain capabilities shown.

FIG. 7 shows non-hydrocarbon supply chain sub-platform 120 divided into respective capability areas 702. The non-hydrocarbon supply chain sub-platform 120 includes sub-platforms for supply chain strategy 706, requirements planning 708, sourcing and procurement 710, fulfillment 712, and requisition to pay 714. Multiple capability descriptions may be shown for each platform or sub-platform.

The tables provided in the appendix listing immediately following the abstract, which form part of this disclosure, provide an explanation of the capabilities and corresponding key assessment areas and performance criteria for each capability within the respective platforms. Each capability may include one or more key assessment areas. In other words, a business capability may include sub-capabilities, and therefore, key assessment areas corresponding to the multiple sub-capabilities. The tables in the Appendix below show specific criteria used to analyze each capability.

Figure 8:
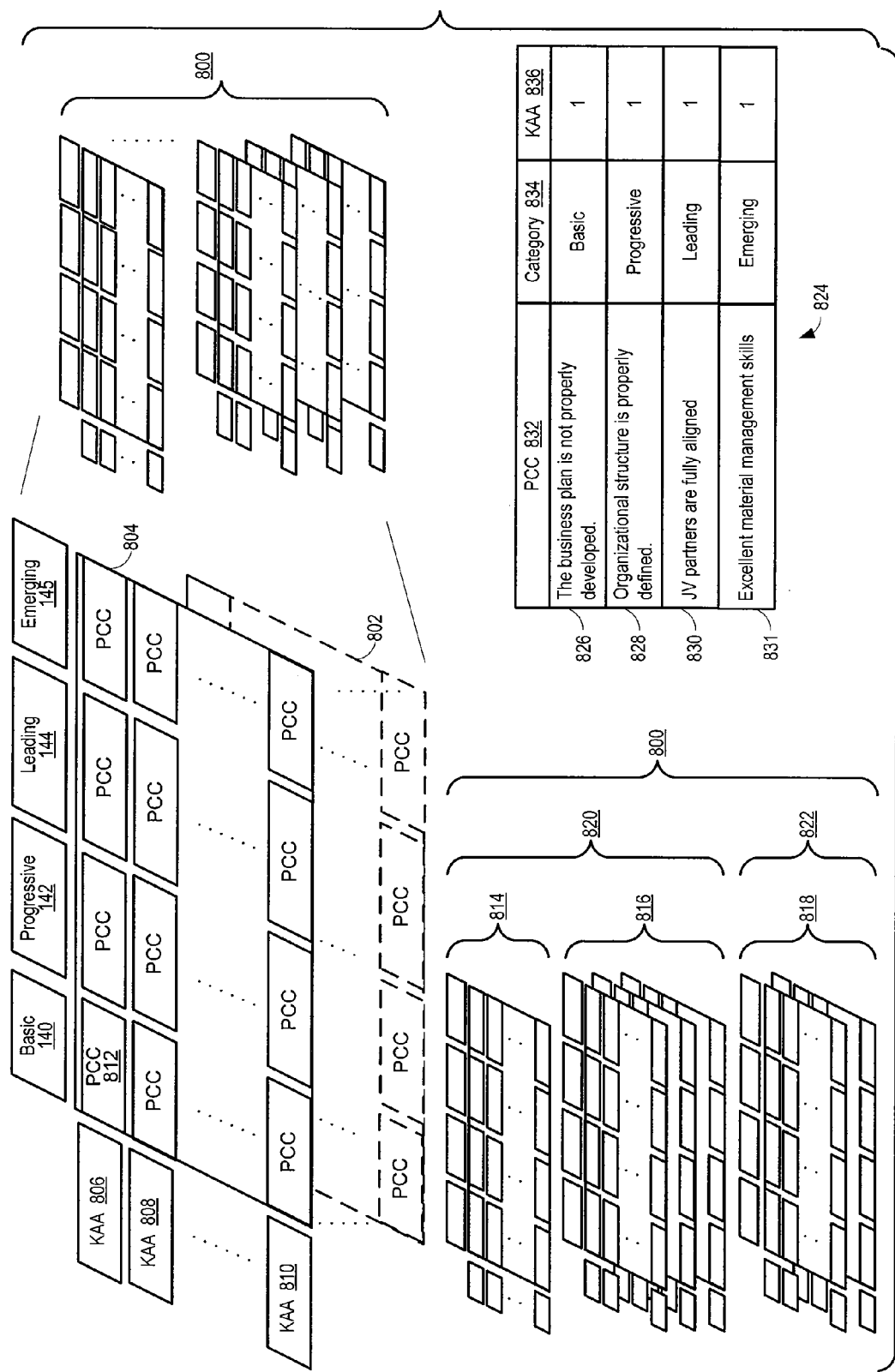
FIG. 8 shows a capability detail pool providing a multidimensional energy industry performance reference set where multiple key assessment performance reference tables are collected and stored.

FIG. 8 shows a multidimensional energy industry performance reference set 800 ("reference set 800") that provides a capability detail pool from which the system described below may obtain benchmarking tables for an energy business. The reference set 800 includes multiple key assessment performance reference tables ("reference tables"), two of which are labeled 802 and 804. Each reference table may provide the benchmarking criteria for a specific capability, such as those noted above with respect to FIGS. 2-7.

One dimension of each table may establish the 'Basic' performance level 140 specifying 'Basic' performance assessment criteria, the 'Progressive' performance level 142 specifying 'Progressive' performance assessment criteria, the 'Leading' performance level 144 specifying 'Leading' performance assessment criteria, and the 'Emerging' performance level 145 specifying 'Emerging' performance assessment criteria. Another dimension of each table may specify one or more key assessment areas (KAAs), several of which are labeled 806, 808, and 810. As noted above, performance criteria, e.g., the PCC 812, populates each key assessment performance reference table to provide benchmark criteria for 'Basic', 'Progressive', 'Leading,' and 'Emerging' characteristics.

The reference set 800 represents the HPCA model 100. Consistent with the HPCA model 100, the reference set 800 may organize multiple reference tables into a hierarchical structure defining discrete changes in granularity. In one implementation, the hierarchical structure includes reference tables, sub-platforms, platforms, and models. FIG. 8 labels three sub-platforms 814, 816, and 818. The reference set 800 may further organize the platforms into sub-platforms, two of which are labeled 820 and 822. Platforms aggregate into the HPCA model 100 and corresponding reference set 800. Additional, different, or fewer levels of granularity may be defined in the HPCA model 100.

The reference set 800 may dynamically populate the reference tables with the most up-to-date performance criteria, for example upon retrieval and presentation by a business analysis consultant. The performance criteria may be retrieved from a performance capability criteria database or other information source.

FIG. 8 also shows an example of a database implementation 824 of a portion of a reference table. In particular, the database implementation 824 includes records (e.g., the records 826, 828, 830, 831) that establish each PCC 812. In the example shown, each record includes a PCC field 832, a category specifier field 834, and a KAA specifier field 836. Other fields may be provided, such as a reference table assignment field or reference set assignment field. The records categorize each PCC into a specific category (e.g., Basic), into a specific KAA, and, optionally, into a specific reference table in a specific reference set for any particular HPCA model.

Figure 9:
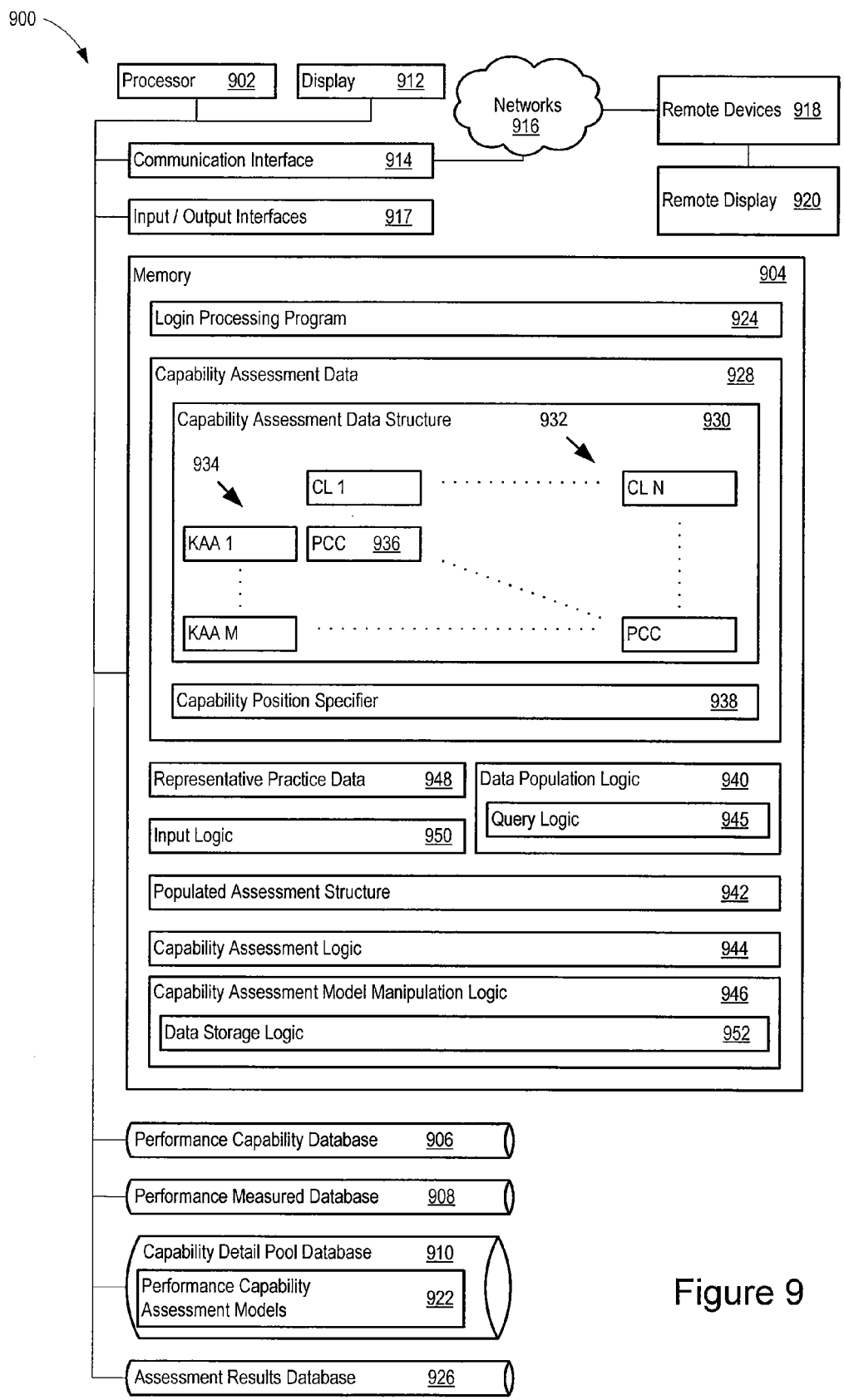
FIG. 9 shows a capability assessment system.

FIG. 9 shows a high-performance capability assessment system ("system") 900. The system 900 includes a processor 902 and a memory 904. Several databases support the operation of the system 900, including a capability performance database 906, a performance measured database 908, a capability detail pool database 910, and an assessment results database 926. The system 900 may include a local display 912 and input/output interfaces 917 (e.g., including a keyboard, mouse, microphone, speakers, or other device), and, through the communication interface 914 and networks 916, may communicate with remote devices 918 and remote displays 920. The networks 916 may be any combination of external networks (e.g., the Internet) and internal networks (e.g., corporate LANs). The displays 912 and 920 may, for example, present performance capability assessment models 922 that the system 900 retrieves from the capability detail pool database 910 for review, modification, and application by process engineers or other individuals. With regard to local access or access by the remote devices 918, the system 900 may include a login processing program 924 to authenticate and/or authorize access to the system 900. To that end, the login processing program 924 may include username/password verification, private/public key encryption, or other validation and data protection capabilities.

In one implementation, the capability performance database 906 stores performance criteria. As will be described in more detail below, the system 900 may populate performance capability assessment models with performance capability criteria suited to any particular platform or sub-platforms (e.g., exploration and production 110, gas operations 112, refining 114, marketing operations 116, hydrocarbon supply chain 118, and non-hydrocarbon supply chain 120) and business capability at one or more capability levels across one or more key assessment areas. The performance measured database 908 may store the determined, measured, or otherwise ascertained characteristics, criteria, and other measured data of a particular key assessment area as representative practice data 948. The representative practice data 948 may be obtained through interviews with business consultants and industrial engineers, through online questionnaires, through manual or automated analysis of business data (e.g., year end operating reports), or in other manners. The capability detail pool database 910 stores the capability detail pool 800, which includes pre-defined performance capability assessment models 922. The assessment results database 926 stores determined capability levels for specific capabilities that have been analyzed.

The system 900 facilitates the review, modification, creation, and application of performance capability assessment models. In that role, performance capability assessment model manipulation logic ("manipulation logic") 946 within the system 900 creates, retrieves, and stores capability assessment data 928 in the memory 904. The manipulation logic 946 may establish capability assessment data 928 in the memory 904, including a capability assessment data structure 930 with multiple capability levels ("CL") 932 organized along a scale of mastery dimension, multiple key assessment areas ("KAA") 934 organized along a key factor dimension, and performance criteria ("PCC") 936 that populates the performance capability assessment model 930. The manipulation logic 946 may vary widely in implementation, and, as one example, may include data storage logic 952 that saves data in memory and user interface logic that accepts capability level specifications, key assessment area specifications and performance capability criteria inputs to create new performance capability assessment models, modify existing performance capability assessment models, delete performance capability assessment models, or retrieve performance capability assessment models for review.

In one implementation, the manipulation logic 946 establishes the capability assessment data structure 930 to include a multidimensional energy industry performance reference set that includes multiple key assessment performance reference tables in which the key assessment performance reference tables include a 'Basic' capability performance level, a 'Progressive' capability performance level, a 'Leading' capability performance level, and an 'Emerging' capability performance level.

The capability assessment data 928 may also include a capability position specifier 938. The capability position specifier 938 may record the capability level along the scale of mastery 146, as determined for any particular capability. Thus, the system 900 may store the performance level in the assessment results database 926 or elsewhere for future retrieval and review.

In one implementation, the data population logic 940 may be a data population program executed by the processor 902 that populates template performance capability assessment models. For example, the data population logic 940 may include input logic 950 that accepts input specifying a capability of interest that indicates a particular performance capability assessment model. The data population logic 940 may include query logic 945 that executes database queries and prompts a user for input to obtain the corresponding performance capability criteria for the capability of interest.

In another implementation, for example, the query logic 945 may receive an input specifying an energy industry area and an energy industry key assessment area with the energy industry area for analysis. The query logic 945 searches the multidimensional energy industry performance reference set for a matching key assessment performance reference table that matches the energy industry area and the energy industry key assessment area, and retrieves the matching key assessment performance reference table.

The data population logic 940 may further include storage logic that adds the retrieved performance capability criteria to the template performance capability assessment model. The data population logic 940 produces populated performance capability assessment structures 942 that may be stored in the capability detail pool database 910.

In addition to the analysis process described above, the system 900 may provide an automated analysis of representative practice data 948 that identifies relevant performance capability criteria and determines the position on the scale of mastery 146 of each key assessment area corresponding to the performance capability criteria for the representative practice data 948. As one example, the system 900 may implement capability assessment logic 944 that includes comparison and/or matching logic that analyzes the representative practice data 948 with respect to performance capability criteria to locate key assessment areas for which the system 900 can determine capability levels to obtain a resultant performance level for each key assessment area.

Furthermore, the capability assessment logic 944 may determine an overall position on the scale of mastery 146 as the capability position specifier 938, for a capability under examination given the knowledge of where the key assessment areas corresponding to the capability under examination fall in each capability level. Thus, for example, the capability assessment logic 944 may determine an overall capability level for a capability corresponding to the capability level for the majority of the key assessment areas, or it may apply a weighted analysis technique to give more emphasis to some key assessment areas than others in determining the overall position on the scale of mastery 146 for a capability. As another example, the capability assessment logic 944 may implement an expert system (e.g., based on a neural network trained on prior determinations) that analyzes the determined characteristics with respect to the performance capability criteria and ascertains where the capability under examination falls along the scale of mastery 146 for each of the key assessment areas, or overall on the scale of mastery.

Figure 10:
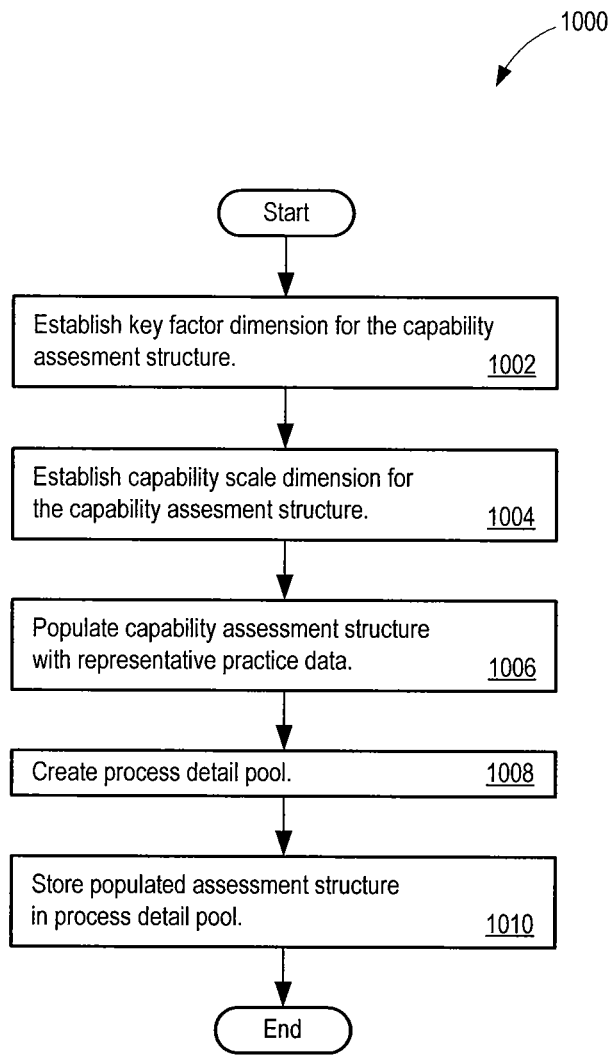
FIG. 10 shows a flow diagram for establishing high-performance capability assessment models.

FIG. 10 shows a flow diagram 1000 for creating performance capability assessment models. The performance capability assessment model creator (e.g., the manipulation logic 946) establishes a key factor dimension for the performance capability assessment model (1002). The performance capability assessment model creator also establishes a capability scale dimension for the performance capability assessment model (1004). The capability scale dimension may define a scale of increasing organizational capability. For example, the structure creator may create the 'Basic' level 140, the 'Progressive' level 142, the 'Leading' level 144, and the 'Emerging' level 145. The performance capability assessment model creator also populates the performance capability assessment model with capability performance criteria (1006). A capability detail pool 800 may be formed to hold multiple tailored key assessment performance reference tables (1008). The performance capability assessment model creator may store the populated assessment structure in the capability detail pool for subsequent retrieval and analysis (1010).

Figure 11:
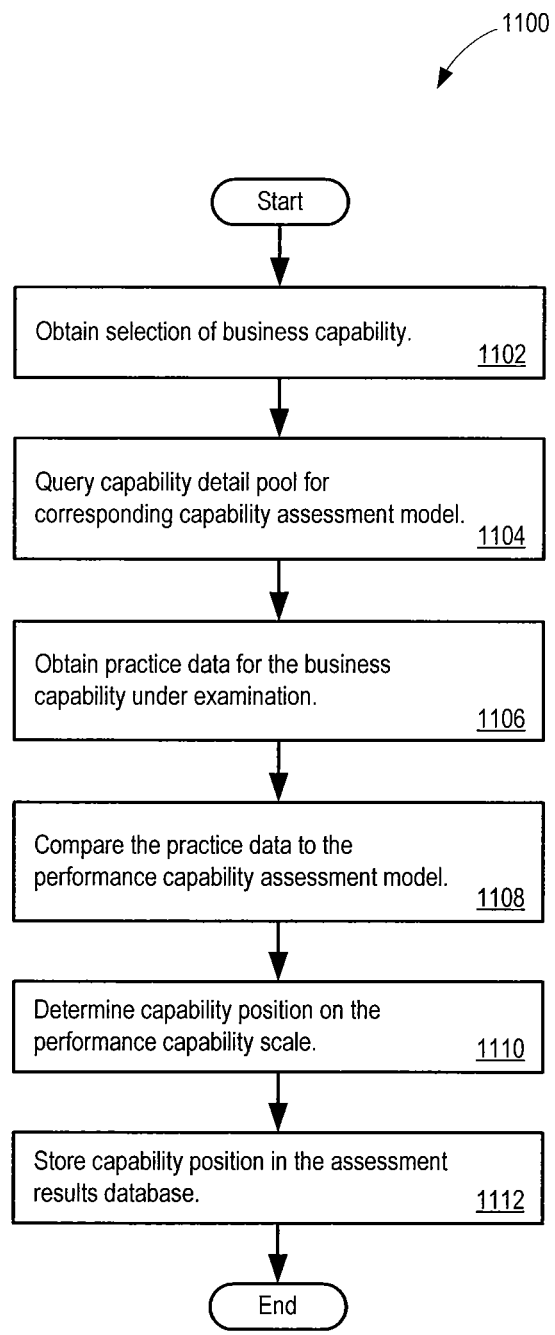
FIG. 11 shows a flow diagram for retrieving and applying high performance capability assessment models.

FIG. 11 shows a flow diagram 1100 for retrieving and applying performance capability assessment models. A selection of a capability to be analyzed is obtained (1102). In one implementation, the system 900 receives input data that specifies an energy industry area and an energy industry key assessment area for analysis. For example, the system 900 may accept input from a business consultant that specifies a capability for analysis. The system 900 may query the capability detail pool 800 for a corresponding performance capability assessment model (1104). The corresponding performance capability assessment model may be pre-defined in the capability detail pool 800, or the data population logic 940 (or other actor) may populate a performance capability assessment model template that the system 900 newly creates, or that the system 900 retrieves from a data store, such as the capability detail pool database 910.

In another example, the system 900 searches the multidimensional energy industry performance reference set in the capability detail pool 800 for a matching key assessment performance reference table based on the input data that specifies an energy industry platform and an energy industry key assessment area. The system 900 retrieves the matching key assessment performance reference table and initiates analysis of the matching key assessment performance reference table to obtain a resultant performance level for the energy industry key assessment area.

The system 900 obtains representative practice data 948 for the capability under examination in the specific business under review (1106). For example, a business consultant may interview the business to determine how the business currently executes the capability under review. As another example, a representative from the business may complete a questionnaire, submit business data for analysis and parameter extraction, or otherwise provide the characteristics of their current capability execution. As a further example, the system 900 may retrieve the representative practice data 948 from a database of previously obtained representative practice data.

The system 900 compares the representative practice data 948 to the performance criteria in the performance capability assessment model (1108). For example, a business consultant may use his or her expertise to arrive at a determination of level for the business and the capability under examination (1110). Alternatively or additionally, the capability assessment logic 944 may perform an automated analysis of the assessment results data in the assessment results database 926 and ascertain the performance level on the scale of mastery 146 (1110). The system 900 may store the assessment results, including the determined performance level, for future reference in the assessment results database 926 or other location (1112).

Figure 12:
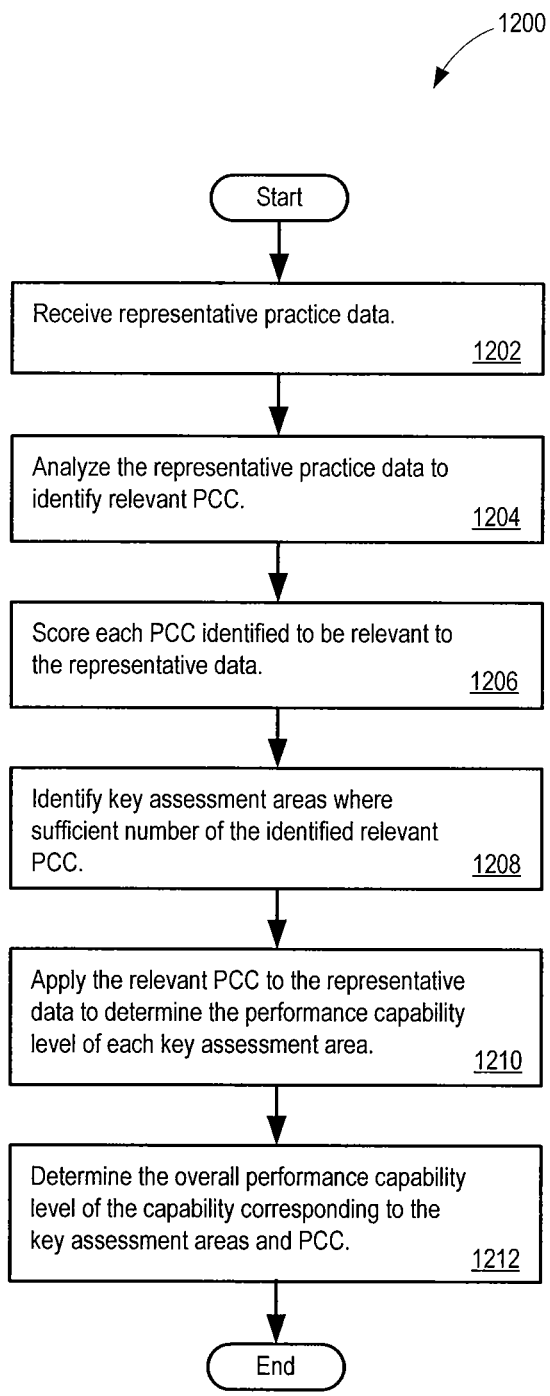
FIG. 12 shows a flow diagram for analyzing representative practice data to determine an energy industry and an energy key assessment area to which the representative practice data applies.

FIG. 12 shows a flow diagram 1200 for analyzing representative practice data 948 to determine an energy industry and an energy key assessment area to which the representative practice data applies. The system 900 receives representative practice data 948 as input data (1202). The system 900 may receive the representative practice data 948 from a database query performed by the query logic 945 that the query logic executes periodically, when instructed by an operator, and/or automatically against any number of available database sources that store representative practice data 948. The capability assessment logic 944 analyzes the representative practice data 948 to identify performance capability criteria in the capability detail pool 800 that the capability assessment logic 944 determines relevant to the representative practice data 948 (1204). For example, the capability assessment logic 944 may compare and/or match the content of the representative practice data 948 with the performance capability criteria using natural language processing (NLP), text string and/or substring matching, by comparing tags linked to the representative practice data 948 and that specify that any portion of the representative practice data 948 is applicable to a specific PCC, by querying for a manual classification of the representative practice data 948 to a PCC, or other matching technique. The capability assessment logic 944 may score and/or weight a performance capability criteria and compare the score and/or weight to a user specified relevance threshold to rank the relevance of the performance capability criteria to the representative practice data 948 (1206). The user may specify particular terms and/or phrases to search and match between the performance capability criteria and the representative practice data 948, in order to score the performance capability criteria.

The capability assessment logic 944 may determine, based on the number of performance capability criteria that meet or exceed the relevance threshold, that the capability assessment logic 944 has identified a sufficient number of performance capability criteria for a specific key assessment area in order to determine a performance level for the capability as a whole or any key assessment area within the capability (1208). As one example, where at least 51% of the performance capability criteria for a particular key assessment area meet or exceed the relevance threshold, the capability assessment logic 944 applies the performance capability criteria to the representative practice data 948. In another example, the performance capability criteria for a particular key assessment area may be ranked in importance and/or designated as mandatory in order to assess the key assessment area. In the event the capability assessment logic 944 identifies the mandatory performance capability criteria for a key assessment area, the capability assessment logic 944 applies the performance capability criteria to the representative practice data 948.

The capability assessment logic 944 may apply the performance capability criteria meeting or exceeding the relevance threshold to the representative practice data 948 to determine whether any particular PCC is met. Accordingly, as the capability assessment logic 944 analyzes the PCC, the system 900 tracks the best fit of the representative practice data 948 to the PCCs in the key assessment performance reference tables. In other words, the system 900 determines how the representative practice data 948 meets (or does not meet) each PCC, thereby gaining insight into whether the representative practice data 948 is indicative of Basic, Progressive, Leading, and Emerging practices.

The system 900 may also gauge the position on the scale of mastery 146 of each key assessment area corresponding to the performance capability criteria (1210). The capability assessment logic 944 may further determine an overall position on the scale of mastery 146 for a capability (1212). The capability assessment logic 944 may establish that a desired number and/or designated mandatory performance capability criteria for the key assessment areas have been identified as relevant to a capability and sufficient to determine the position on the scale of mastery 146 for the capability. For example, the capability assessment logic 944 may determine an overall performance level for the capability based on the performance level determined for the majority of the key assessment areas. The capability assessment logic 944 may apply a weighted analysis technique to give more emphasis to some key assessment areas than others in determining the overall position on the scale of mastery 146 for the capability.

Although selected aspects, features, or components of the implementations are depicted as being stored in computer-readable memories (e.g., as computer-executable instructions or performance capability assessment models), all or part of the systems and structures may be stored on, distributed across, or read from other computer-readable media. The computer-readable media may include, for example, secondary storage devices such as hard disks, floppy disks, and CD-ROMs; a signal, such as a signal received from a network or received at an antenna; or other forms of memory, including ROM or RAM, either currently known or later developed.

Various implementations of the system 900 may include additional or different components. A processor may be implemented as a microprocessor, a microcontroller, a DSP, an application specific integrated circuit (ASIC), discrete logic, or a combination of other types of circuits or logic. Similarly, memories may be DRAM, SRAM, Flash or any other type of memory. The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be combined or split among multiple programs, or distributed across several memories and processors.

The HPCA 100 model provides unexpectedly good results for a performance capability assessment model, particularly in the energy industry. In particular, the combinations of key assessment areas and particular assessment criteria of the HPCA model, including the criteria noted in the above tables, provide significant advantages over other assessment models. The unexpectedly good results include clearly identifying and delineating from among multiple related complex processes the specific processes to improve, and how to improve the process and identifying concrete and measurable improvement goals.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

Lengthy table referenced here

US08880422-20141104-T00001

Please refer to the end of the specification for access instructions.

Lengthy table referenced here

US08880422-20141104-T00002

Please refer to the end of the specification for access instructions.

Lengthy table referenced here

US08880422-20141104-T00003

Please refer to the end of the specification for access instructions.

Lengthy table referenced here

US08880422-20141104-T00004

Please refer to the end of the specification for access instructions.

Lengthy table referenced here

US08880422-20141104-T00005

Please refer to the end of the specification for access instructions.

Lengthy table referenced here

US08880422-20141104-T00006

Please refer to the end of the specification for access instructions.

Lengthy table referenced here
US08880422-20141104-T00007
Please refer to the end of the specification for access instructions.

Lengthy table referenced here
US08880422-20141104-T00008
Please refer to the end of the specification for access instructions.

Lengthy table referenced here
US08880422-20141104-T00009
Please refer to the end of the specification for access instructions.

Lengthy table referenced here
US08880422-20141104-T00010
Please refer to the end of the specification for access instructions.

Lengthy table referenced here
US08880422-20141104-T00011
Please refer to the end of the specification for access instructions.

Lengthy table referenced here
US08880422-20141104-T00012
Please refer to the end of the specification for access instructions.

Lengthy table referenced here
US08880422-20141104-T00013
Please refer to the end of the specification for access instructions.

Lengthy table referenced here
US08880422-20141104-T00014
Please refer to the end of the specification for access instructions.

Lengthy table referenced here
US08880422-20141104-T00015
Please refer to the end of the specification for access instructions.

Lengthy table referenced here
US08880422-20141104-T00016
Please refer to the end of the specification for access instructions.

Lengthy table referenced here
US08880422-20141104-T00017
Please refer to the end of the specification for access instructions.

Lengthy table referenced here
US08880422-20141104-T00018
Please refer to the end of the specification for access instructions.

Lengthy table referenced here
US08880422-20141104-T00019
Please refer to the end of the specification for access instructions.

Lengthy table referenced here
US08880422-20141104-T00020
Please refer to the end of the specification for access instructions.

Lengthy table referenced here
US08880422-20141104-T00021
Please refer to the end of the specification for access instructions.

Lengthy table referenced here
US08880422-20141104-T00022
Please refer to the end of the specification for access instructions.

Lengthy table referenced here
US08880422-20141104-T00023

Please refer to the end of the specification for access instructions.

Lengthy table referenced here
US08880422-20141104-T00024

Please refer to the end of the specification for access instructions.

Lengthy table referenced here
US08880422-20141104-T00025

Please refer to the end of the specification for access instructions.

Lengthy table referenced here
US08880422-20141104-T00026

Please refer to the end of the specification for access instructions.

Lengthy table referenced here
US08880422-20141104-T00027

Please refer to the end of the specification for access instructions.

Lengthy table referenced here
US08880422-20141104-T00028

Please refer to the end of the specification for access instructions.

Lengthy table referenced here
US08880422-20141104-T00029

Please refer to the end of the specification for access instructions.

Lengthy table referenced here
US08880422-20141104-T00030

Please refer to the end of the specification for access instructions.

Lengthy table referenced here
US08880422-20141104-T00031

Please refer to the end of the specification for access instructions.

Lengthy table referenced here
US08880422-20141104-T00032

Please refer to the end of the specification for access instructions.

Lengthy table referenced here
US08880422-20141104-T00033

Please refer to the end of the specification for access instructions.

Lengthy table referenced here
US08880422-20141104-T00034

Please refer to the end of the specification for access instructions.

Lengthy table referenced here
US08880422-20141104-T00035

Please refer to the end of the specification for access instructions.

Lengthy table referenced here
US08880422-20141104-T00036

Please refer to the end of the specification for access instructions.

Lengthy table referenced here
US08880422-20141104-T00037

Please refer to the end of the specification for access instructions.

Lengthy table referenced here
US08880422-20141104-T00038

Please refer to the end of the specification for access instructions.

Lengthy table referenced here
US08880422-20141104-T00039

Please refer to the end of the specification for access instructions.

Lengthy table referenced here
US08880422-20141104-T00040

Please refer to the end of the specification for access instructions.

Lengthy table referenced here
US08880422-20141104-T00041

Please refer to the end of the specification for access instructions.

Lengthy table referenced here
US08880422-20141104-T00042

Please refer to the end of the specification for access instructions.

Lengthy table referenced here
US08880422-20141104-T00043

Please refer to the end of the specification for access instructions.

Lengthy table referenced here
US08880422-20141104-T00044

Please refer to the end of the specification for access instructions.

Lengthy table referenced here
US08880422-20141104-T00045

Please refer to the end of the specification for access instructions.

Lengthy table referenced here
US08880422-20141104-T00046

Please refer to the end of the specification for access instructions.

Lengthy table referenced here
US08880422-20141104-T00047

Please refer to the end of the specification for access instructions.

Lengthy table referenced here
US08880422-20141104-T00048

Please refer to the end of the specification for access instructions.

Lengthy table referenced here
US08880422-20141104-T00049

Please refer to the end of the specification for access instructions.

Lengthy table referenced here
US08880422-20141104-T00050

Please refer to the end of the specification for access instructions.

Lengthy table referenced here
US08880422-20141104-T00051

Please refer to the end of the specification for access instructions.

Lengthy table referenced here
US08880422-20141104-T00052

Please refer to the end of the specification for access instructions.

Lengthy table referenced here
US08880422-20141104-T00053

Please refer to the end of the specification for access instructions.

Lengthy table referenced here
US08880422-20141104-T00054

Please refer to the end of the specification for access instructions.

Lengthy table referenced here
US08880422-20141104-T00055
Please refer to the end of the specification for access instructions.

Lengthy table referenced here
US08880422-20141104-T00056
Please refer to the end of the specification for access instructions.

Lengthy table referenced here
US08880422-20141104-T00057
Please refer to the end of the specification for access instructions.

Lengthy table referenced here
US08880422-20141104-T00058
Please refer to the end of the specification for access instructions.

Lengthy table referenced here
US08880422-20141104-T00059
Please refer to the end of the specification for access instructions.

Lengthy table referenced here
US08880422-20141104-T00060
Please refer to the end of the specification for access instructions.

Lengthy table referenced here
US08880422-20141104-T00061
Please refer to the end of the specification for access instructions.

Lengthy table referenced here
US08880422-20141104-T00062
Please refer to the end of the specification for access instructions.

Lengthy table referenced here
US08880422-20141104-T00063
Please refer to the end of the specification for access instructions.

Lengthy table referenced here
US08880422-20141104-T00064
Please refer to the end of the specification for access instructions.

Lengthy table referenced here
US08880422-20141104-T00065
Please refer to the end of the specification for access instructions.

Lengthy table referenced here
US08880422-20141104-T00066
Please refer to the end of the specification for access instructions.

Lengthy table referenced here
US08880422-20141104-T00067
Please refer to the end of the specification for access instructions.

Lengthy table referenced here
US08880422-20141104-T00068
Please refer to the end of the specification for access instructions.

Lengthy table referenced here
US08880422-20141104-T00069
Please refer to the end of the specification for access instructions.

Lengthy table referenced here
US08880422-20141104-T00070
Please refer to the end of the specification for access instructions.

Lengthy table referenced here
US08880422-20141104-T00071

Please refer to the end of the specification for access instructions.

Lengthy table referenced here
US08880422-20141104-T00072

Please refer to the end of the specification for access instructions.

Lengthy table referenced here
US08880422-20141104-T00073

Please refer to the end of the specification for access instructions.

Lengthy table referenced here
US08880422-20141104-T00074

Please refer to the end of the specification for access instructions.

Lengthy table referenced here
US08880422-20141104-T00075

Please refer to the end of the specification for access instructions.

Lengthy table referenced here
US08880422-20141104-T00076

Please refer to the end of the specification for access instructions.

Lengthy table referenced here
US08880422-20141104-T00077

Please refer to the end of the specification for access instructions.

Lengthy table referenced here
US08880422-20141104-T00078

Please refer to the end of the specification for access instructions.

Lengthy table referenced here
US08880422-20141104-T00079

Please refer to the end of the specification for access instructions.

Lengthy table referenced here
US08880422-20141104-T00080

Please refer to the end of the specification for access instructions.

Lengthy table referenced here
US08880422-20141104-T00081

Please refer to the end of the specification for access instructions.

Lengthy table referenced here
US08880422-20141104-T00082

Please refer to the end of the specification for access instructions.

Lengthy table referenced here
US08880422-20141104-T00083

Please refer to the end of the specification for access instructions.

Lengthy table referenced here
US08880422-20141104-T00084

Please refer to the end of the specification for access instructions.

Lengthy table referenced here
US08880422-20141104-T00085

Please refer to the end of the specification for access instructions.

Lengthy table referenced here
US08880422-20141104-T00086

Please refer to the end of the specification for access instructions.

Lengthy table referenced here
US08880422-20141104-T00087

Please refer to the end of the specification for access instructions.

Lengthy table referenced here
US08880422-20141104-T00088

Please refer to the end of the specification for access instructions.

Lengthy table referenced here
US08880422-20141104-T00089

Please refer to the end of the specification for access instructions.

Lengthy table referenced here
US08880422-20141104-T00090

Please refer to the end of the specification for access instructions.

Lengthy table referenced here
US08880422-20141104-T00091

Please refer to the end of the specification for access instructions.

Lengthy table referenced here
US08880422-20141104-T00092

Please refer to the end of the specification for access instructions.

Lengthy table referenced here
US08880422-20141104-T00093

Please refer to the end of the specification for access instructions.

Lengthy table referenced here
US08880422-20141104-T00094

Please refer to the end of the specification for access instructions.

Lengthy table referenced here
US08880422-20141104-T00095

Please refer to the end of the specification for access instructions.

Lengthy table referenced here
US08880422-20141104-T00096

Please refer to the end of the specification for access instructions.

Lengthy table referenced here
US08880422-20141104-T00097

Please refer to the end of the specification for access instructions.

Lengthy table referenced here
US08880422-20141104-T00098

Please refer to the end of the specification for access instructions.

Lengthy table referenced here
US08880422-20141104-T00099

Please refer to the end of the specification for access instructions.

Lengthy table referenced here
US08880422-20141104-T00100

Please refer to the end of the specification for access instructions.

Lengthy table referenced here
US08880422-20141104-T00101

Please refer to the end of the specification for access instructions.

Lengthy table referenced here
US08880422-20141104-T00102

Please refer to the end of the specification for access instructions.

Lengthy table referenced here
US08880422-20141104-T00103

Please refer to the end of the specification for access instructions.

Lengthy table referenced here
US08880422-20141104-T00104

Please refer to the end of the specification for access instructions.

Lengthy table referenced here
US08880422-20141104-T00105

Please refer to the end of the specification for access instructions.

Lengthy table referenced here
US08880422-20141104-T00106

Please refer to the end of the specification for access instructions.

Lengthy table referenced here
US08880422-20141104-T00107

Please refer to the end of the specification for access instructions.

Lengthy table referenced here
US08880422-20141104-T00108

Please refer to the end of the specification for access instructions.

Lengthy table referenced here
US08880422-20141104-T00109

Please refer to the end of the specification for access instructions.

Lengthy table referenced here
US08880422-20141104-T00110

Please refer to the end of the specification for access instructions.

Lengthy table referenced here
US08880422-20141104-T00111

Please refer to the end of the specification for access instructions.

Lengthy table referenced here
US08880422-20141104-T00112

Please refer to the end of the specification for access instructions.

Lengthy table referenced here
US08880422-20141104-T00113

Please refer to the end of the specification for access instructions.

Lengthy table referenced here
US08880422-20141104-T00114

Please refer to the end of the specification for access instructions.

Lengthy table referenced here
US08880422-20141104-T00115

Please refer to the end of the specification for access instructions.

Lengthy table referenced here
US08880422-20141104-T00116

Please refer to the end of the specification for access instructions.

Lengthy table referenced here
US08880422-20141104-T00117

Please refer to the end of the specification for access instructions.

Lengthy table referenced here
US08880422-20141104-T00118

Please refer to the end of the specification for access instructions.

Lengthy table referenced here
US08880422-20141104-T00119

Please refer to the end of the specification for access instructions.

Lengthy table referenced here
US08880422-20141104-T00120

Please refer to the end of the specification for access instructions.

Lengthy table referenced here
US08880422-20141104-T00121

Please refer to the end of the specification for access instructions.

Lengthy table referenced here
US08880422-20141104-T00122

Please refer to the end of the specification for access instructions.

Lengthy table referenced here
US08880422-20141104-T00123

Please refer to the end of the specification for access instructions.

Lengthy table referenced here
US08880422-20141104-T00124

Please refer to the end of the specification for access instructions.

Lengthy table referenced here
US08880422-20141104-T00125

Please refer to the end of the specification for access instructions.

Lengthy table referenced here
US08880422-20141104-T00126

Please refer to the end of the specification for access instructions.

Lengthy table referenced here
US08880422-20141104-T00127

Please refer to the end of the specification for access instructions.

Lengthy table referenced here
US08880422-20141104-T00128

Please refer to the end of the specification for access instructions.

Lengthy table referenced here
US08880422-20141104-T00129

Please refer to the end of the specification for access instructions.

Lengthy table referenced here
US08880422-20141104-T00130

Please refer to the end of the specification for access instructions.

Lengthy table referenced here
US08880422-20141104-T00131

Please refer to the end of the specification for access instructions.

Lengthy table referenced here
US08880422-20141104-T00132

Please refer to the end of the specification for access instructions.

Lengthy table referenced here
US08880422-20141104-T00133

Please refer to the end of the specification for access instructions.

Lengthy table referenced here
US08880422-20141104-T00134

Please refer to the end of the specification for access instructions.

Lengthy table referenced here
US08880422-20141104-T00135
Please refer to the end of the specification for access instructions.

Lengthy table referenced here
US08880422-20141104-T00136
Please refer to the end of the specification for access instructions.

Lengthy table referenced here
US08880422-20141104-T00137
Please refer to the end of the specification for access instructions.

Lengthy table referenced here
US08880422-20141104-T00138
Please refer to the end of the specification for access instructions.

Lengthy table referenced here
US08880422-20141104-T00139
Please refer to the end of the specification for access instructions.

Lengthy table referenced here
US08880422-20141104-T00140
Please refer to the end of the specification for access instructions.

Lengthy table referenced here
US08880422-20141104-T00141
Please refer to the end of the specification for access instructions.

Lengthy table referenced here
US08880422-20141104-T00142
Please refer to the end of the specification for access instructions.

Lengthy table referenced here
US08880422-20141104-T00143
Please refer to the end of the specification for access instructions.

Lengthy table referenced here
US08880422-20141104-T00144
Please refer to the end of the specification for access instructions.

Lengthy table referenced here
US08880422-20141104-T00145
Please refer to the end of the specification for access instructions.

Lengthy table referenced here
US08880422-20141104-T00146
Please refer to the end of the specification for access instructions.

Lengthy table referenced here
US08880422-20141104-T00147
Please refer to the end of the specification for access instructions.

Lengthy table referenced here
US08880422-20141104-T00148
Please refer to the end of the specification for access instructions.

Lengthy table referenced here
US08880422-20141104-T00149
Please refer to the end of the specification for access instructions.

Lengthy table referenced here
US08880422-20141104-T00150
Please refer to the end of the specification for access instructions.

| Lengthy table referenced here | Lengthy table referenced here |
| US08880422-20141104-T00151 | US08880422-20141104-T00159 |
| Please refer to the end of the specification for access instructions. | Please refer to the end of the specification for access instructions. |

| Lengthy table referenced here | Lengthy table referenced here |
| US08880422-20141104-T00152 | US08880422-20141104-T00160 |
| Please refer to the end of the specification for access instructions. | Please refer to the end of the specification for access instructions. |

| Lengthy table referenced here | Lengthy table referenced here |
| US08880422-20141104-T00153 | US08880422-20141104-T00161 |
| Please refer to the end of the specification for access instructions. | Please refer to the end of the specification for access instructions. |

| Lengthy table referenced here | Lengthy table referenced here |
| US08880422-20141104-T00154 | US08880422-20141104-T00162 |
| Please refer to the end of the specification for access instructions. | Please refer to the end of the specification for access instructions. |

| Lengthy table referenced here | Lengthy table referenced here |
| US08880422-20141104-T00155 | US08880422-20141104-T00163 |
| Please refer to the end of the specification for access instructions. | Please refer to the end of the specification for access instructions. |

| Lengthy table referenced here | Lengthy table referenced here |
| US08880422-20141104-T00156 | US08880422-20141104-T00164 |
| Please refer to the end of the specification for access instructions. | Please refer to the end of the specification for access instructions. |

| Lengthy table referenced here | Lengthy table referenced here |
| US08880422-20141104-T00157 | US08880422-20141104-T00165 |
| Please refer to the end of the specification for access instructions. | Please refer to the end of the specification for access instructions. |

| Lengthy table referenced here | Lengthy table referenced here |
| US08880422-20141104-T00158 | US08880422-20141104-T00166 |
| Please refer to the end of the specification for access instructions. | Please refer to the end of the specification for access instructions. |

Lengthy table referenced here
US08880422-20141104-T00167
Please refer to the end of the specification for access instructions.

Lengthy table referenced here
US08880422-20141104-T00168
Please refer to the end of the specification for access instructions.

Lengthy table referenced here
US08880422-20141104-T00169
Please refer to the end of the specification for access instructions.

Lengthy table referenced here
US08880422-20141104-T00170
Please refer to the end of the specification for access instructions.

Lengthy table referenced here
US08880422-20141104-T00171
Please refer to the end of the specification for access instructions.

Lengthy table referenced here
US08880422-20141104-T00172
Please refer to the end of the specification for access instructions.

Lengthy table referenced here
US08880422-20141104-T00173
Please refer to the end of the specification for access instructions.

Lengthy table referenced here
US08880422-20141104-T00174
Please refer to the end of the specification for access instructions.

Lengthy table referenced here
US08880422-20141104-T00175
Please refer to the end of the specification for access instructions.

Lengthy table referenced here
US08880422-20141104-T00176
Please refer to the end of the specification for access instructions.

Lengthy table referenced here
US08880422-20141104-T00177
Please refer to the end of the specification for access instructions.

Lengthy table referenced here
US08880422-20141104-T00178
Please refer to the end of the specification for access instructions.

Lengthy table referenced here
US08880422-20141104-T00179
Please refer to the end of the specification for access instructions.

Lengthy table referenced here
US08880422-20141104-T00180
Please refer to the end of the specification for access instructions.

Lengthy table referenced here
US08880422-20141104-T00181
Please refer to the end of the specification for access instructions.

Lengthy table referenced here
US08880422-20141104-T00182
Please refer to the end of the specification for access instructions.

Lengthy table referenced here
US08880422-20141104-T00183
Please refer to the end of the specification for access instructions.

Lengthy table referenced here
US08880422-20141104-T00184
Please refer to the end of the specification for access instructions.

Lengthy table referenced here
US08880422-20141104-T00185
Please refer to the end of the specification for access instructions.

Lengthy table referenced here
US08880422-20141104-T00186
Please refer to the end of the specification for access instructions.

Lengthy table referenced here
US08880422-20141104-T00187
Please refer to the end of the specification for access instructions.

Lengthy table referenced here
US08880422-20141104-T00188
Please refer to the end of the specification for access instructions.

Lengthy table referenced here
US08880422-20141104-T00189
Please refer to the end of the specification for access instructions.

Lengthy table referenced here
US08880422-20141104-T00190
Please refer to the end of the specification for access instructions.

Lengthy table referenced here
US08880422-20141104-T00191
Please refer to the end of the specification for access instructions.

Lengthy table referenced here
US08880422-20141104-T00192
Please refer to the end of the specification for access instructions.

Lengthy table referenced here
US08880422-20141104-T00193
Please refer to the end of the specification for access instructions.

Lengthy table referenced here
US08880422-20141104-T00194
Please refer to the end of the specification for access instructions.

Lengthy table referenced here
US08880422-20141104-T00195
Please refer to the end of the specification for access instructions.

Lengthy table referenced here
US08880422-20141104-T00196
Please refer to the end of the specification for access instructions.

Lengthy table referenced here
US08880422-20141104-T00197
Please refer to the end of the specification for access instructions.

Lengthy table referenced here
US08880422-20141104-T00198
Please refer to the end of the specification for access instructions.

Lengthy table referenced here
US08880422-20141104-T00199
Please refer to the end of the specification for access instructions.

Lengthy table referenced here
US08880422-20141104-T00200
Please refer to the end of the specification for access instructions.

Lengthy table referenced here
US08880422-20141104-T00201
Please refer to the end of the specification for access instructions.

Lengthy table referenced here
US08880422-20141104-T00202
Please refer to the end of the specification for access instructions.

Lengthy table referenced here
US08880422-20141104-T00203
Please refer to the end of the specification for access instructions.

Lengthy table referenced here
US08880422-20141104-T00204
Please refer to the end of the specification for access instructions.

Lengthy table referenced here
US08880422-20141104-T00205
Please refer to the end of the specification for access instructions.

Lengthy table referenced here
US08880422-20141104-T00206
Please refer to the end of the specification for access instructions.

Lengthy table referenced here
US08880422-20141104-T00207
Please refer to the end of the specification for access instructions.

Lengthy table referenced here
US08880422-20141104-T00208
Please refer to the end of the specification for access instructions.

Lengthy table referenced here
US08880422-20141104-T00209
Please refer to the end of the specification for access instructions.

Lengthy table referenced here
US08880422-20141104-T00210
Please refer to the end of the specification for access instructions.

Lengthy table referenced here
US08880422-20141104-T00211
Please refer to the end of the specification for access instructions.

Lengthy table referenced here
US08880422-20141104-T00212
Please refer to the end of the specification for access instructions.

Lengthy table referenced here
US08880422-20141104-T00213
Please refer to the end of the specification for access instructions.

Lengthy table referenced here
US08880422-20141104-T00214
Please refer to the end of the specification for access instructions.

Lengthy table referenced here

US08880422-20141104-T00215

Please refer to the end of the specification for access instructions.

Lengthy table referenced here

US08880422-20141104-T00216

Please refer to the end of the specification for access instructions.

Lengthy table referenced here

US08880422-20141104-T00217

Please refer to the end of the specification for access instructions.

Lengthy table referenced here

US08880422-20141104-T00218

Please refer to the end of the specification for access instructions.

Lengthy table referenced here

US08880422-20141104-T00219

Please refer to the end of the specification for access instructions.

Lengthy table referenced here

US08880422-20141104-T00220

Please refer to the end of the specification for access instructions.

Lengthy table referenced here

US08880422-20141104-T00221

Please refer to the end of the specification for access instructions.

Lengthy table referenced here

US08880422-20141104-T00222

Please refer to the end of the specification for access instructions.

LENGTHY TABLES

The patent contains a lengthy table section. A copy of the table is available in electronic form from the USPTO web site (http://seqdata.uspto.gov/?pageRequest=docDetail&DocID=US08880422B1). An electronic copy of the table will also be available from the USPTO upon request and payment of the fee set forth in 37 CFR 1.19(b)(3).

We claim:

1. A computer-implemented method for high performance capability assessment of an energy business, comprising:
defining, by a processor coupled to a machine-readable memory, a multidimensional energy industry performance reference set stored in the memory and comprising multiple key assessment performance reference tables, at least one key assessment performance reference table further defining an energy production platform:
a 'Basic' performance level specifying 'Basic' performance assessment criteria;
a 'Progressive' performance level specifying 'Progressive' performance assessment criteria;
a 'Leading' performance level specifying 'Leading' performance assessment criteria; and
an 'Emerging' performance level specifying 'Emerging' performance assessment criteria;
establishing production operation management performance assessment criteria corresponding to the energy production platform,
wherein the 'Basic' performance assessment criteria includes a first criteria where a proactive approach to production management does not exist;
wherein the 'Progressive' performance assessment criteria includes a first criteria where limited efforts are made towards the identification of production losses and possible threats;
wherein the 'Leading' performance assessment criteria includes a first criteria where production losses and possible threats are identified and action plans are implemented and effectively tracked;
wherein the 'Emerging' performance assessment criteria includes a first criteria where production losses, possible threats and opportunities to improve production are identified;
receiving, through a communication interface coupled to the processor, an input specifying an energy industry area, an energy industry key assessment area, and current capabilities corresponding to an energy business under examination, for analysis;
searching, by the processor, the multidimensional energy industry performance reference set for a matching key assessment performance reference table that matches the energy industry area and the energy industry key assessment area;
retrieving, by the processor, the matching key assessment performance reference table;

analyzing, by the processor, the retrieved matching key assessment performance reference table, the analysis including comparing the current capabilities received through the communication interface to the first criteria of each of the Basic performance assessment criteria, the Progressive performance assessment criteria, the Leading performance assessment criteria, and the Emerging performance assessment criteria; and obtaining, by the processor, a resultant performance level for the energy industry key assessment area, wherein the resultant performance level corresponds to a position along a scale of mastery that includes the Basic performance level, the Progressive performance level, the Leading performance level, and the Emerging performance level.

2. The computer-implemented method of claim 1,
wherein the 'Basic' performance assessment criteria includes:
a second criteria: Only corrective actions are implemented;
wherein the 'Progressive' performance assessment criteria includes:
a second criteria: There is no effective control of the implementation of action plans;
wherein the 'Leading' performance assessment criteria includes:
a second criteria: No substantial efforts are made towards the identification of opportunities that could improve production;
wherein the 'Emerging' performance assessment criteria includes:
a second criteria: Action plans are implemented and effectively tracked to optimize production.

3. A computer-implemented method for high performance capability assessment of an energy business, comprising:
defining, by a processor coupled to a machine-readable memory, a multidimensional energy industry performance reference set stored in the memory and comprising multiple key assessment performance reference tables, at least one key assessment performance reference table further defining an energy production platform including:
a 'Basic' performance level specifying 'Basic' performance assessment criteria;
a 'Progressive' performance level specifying 'Progressive' performance assessment criteria;
a 'Leading' performance level specifying 'Leading' performance assessment criteria; and
an 'Emerging' performance level specifying 'Emerging' performance assessment criteria;
establishing maintenance management assessment criteria corresponding to the energy production platform,
wherein the 'Basic' performance assessment criteria includes a first criteria where no predictive and preventive maintenance plans exist;
wherein the 'Progressive' performance assessment criteria includes a first criteria where predictive and preventive maintenance plans are approved;
wherein the 'Leading' performance assessment criteria includes a first criteria where predictive and preventive maintenance plans are approved and processes are formally documented and used by all teams involved;
wherein the 'Emerging' performance assessment criteria includes a first criteria where predictive and preventive maintenance plans are approved and processes are formally documented and used by all teams involved;

receiving, through a communication interface coupled to the processor, an input specifying an energy industry area, an energy industry key assessment area, and current capabilities corresponding to an energy business under examination, for analysis;
searching, by the processor, the multidimensional energy industry performance reference set for a matching key assessment performance reference table that matches the energy industry area and the energy industry key assessment area;
retrieving, by the processor, the matching key assessment performance reference table;
analyzing, by the processor, the retrieved matching key assessment performance reference table, the analysis including comparing the current capabilities received through the communication interface to the first criteria of each of the Basic performance assessment criteria, the Progressive performance assessment criteria, the Leading performance assessment criteria, and the Emerging performance assessment criteria; and
obtaining, by the processor, a resultant performance level for the energy industry key assessment area, wherein the resultant performance level corresponds to a position along a scale of mastery that includes the Basic performance level, the Progressive performance level, the Leading performance level, and the Emerging performance level.

4. A computer-implemented method for high performance capability assessment of an energy business, comprising:
defining, by a processor coupled to a machine-readable memory, a multidimensional energy industry performance reference set stored in the memory and comprising multiple key assessment performance reference tables, at least one key assessment performance reference table further defining an energy production platform including:
a 'Basic' performance level specifying 'Basic' performance assessment criteria;
a 'Progressive' performance level specifying 'Progressive' performance assessment criteria;
a 'Leading' performance level specifying 'Leading' performance assessment criteria; and
an 'Emerging' performance level specifying 'Emerging' performance assessment criteria;
establishing maintenance management assessment criteria corresponding to the energy production platform,
wherein the 'Basic' performance assessment criteria includes a first criteria where each area has its own schedule; there is not an established process to perform activities prioritization;
wherein the 'Progressive' performance assessment criteria includes a first criteria where each area has its own schedule and there is not an established process to perform activities prioritization;
wherein the 'Leading' performance assessment criteria includes a first criteria where field activities are integrated in a single schedule and there is an established process to perform activities prioritization;
wherein the 'Emerging' performance assessment criteria includes a first criteria where field activities are integrated in a single schedule, which is available for all areas involved, and there is an established process to perform activities prioritization;

receiving, through a communication interface coupled to the processor, an input specifying an energy industry area, an energy industry key assessment area, and current capabilities corresponding to an energy business under examination, for analysis;

searching, by the processor, the multidimensional energy industry performance reference set for a matching key assessment performance reference table that matches the energy industry area and the energy industry key assessment area;

retrieving, by the processor, the matching key assessment performance reference table;

analyzing, by the processor, the retrieved matching key assessment performance reference table, the analysis including comparing the current capabilities received through the communication interface to the first criteria of each of the Basic performance assessment criteria, the Progressive performance assessment criteria, the Leading performance assessment criteria, and the Emerging performance assessment criteria; and obtaining, by the processor, a resultant performance level for the energy industry key assessment area, wherein the resultant performance level corresponds to a position along a scale of mastery that includes the Basic performance level, the Progressive performance level, the Leading performance level, and the Emerging performance level.

5. The computer-implemented method of claim 1, further including establishing reservoir management assessment criteria, wherein the 'Basic' performance assessment criteria includes:
a second criteria: No efforts are made towards improvement of information sharing;
a third criteria: Proactive reservoir management does not exist;
wherein the 'Progressive' performance assessment criteria includes:
a second criteria: Efforts are made towards improving information sharing;
wherein the 'Leading' performance assessment criteria includes:
a third criteria: Information is still not timely provided
wherein the 'Emerging' performance assessment criteria includes:
a second criteria: Proactive reservoir management is allowed through real-time reservoir surveillance which enables the teams to timely observe changes in the reservoir and, therefore, anticipate and mitigate production loss.

6. The computer-implemented method of claim 1, further including establishing reservoir management assessment criteria, wherein the 'Basic' performance assessment criteria includes:
a second criteria: Reservoir Engineering does not monitor Production activities and variances to plan on a regular basis;
wherein the 'Progressive' performance assessment criteria includes:
a second criteria: Reservoir Engineering does not monitor Production activities and variances to plan on a regular basis;
wherein the 'Leading' performance assessment criteria includes:

a second criteria: Reservoir Engineering does not monitor Production activities and variances to plan on a regular basis;
wherein the 'Emerging' performance assessment criteria includes:
a second criteria: Reservoir Engineering monitors Production activities and variances to plan on a regular basis.

7. A non-transitory computer-readable medium encoded with data representing a computer program for a high-performance capability assessment of an energy industry, the computer-readable memory causing the computer to perform the acts of:

providing a processor operatively coupled to a communication network;

providing one or more databases operatively coupled to the processor and accessible through the communication network;

coupling an interface to the processor for receiving input;

defining, by the processor coupled to a machine-readable memory, in said one or more databases, a multidimensional energy industry performance reference set further comprising multiple key assessment performance reference tables, at least one key assessment performance reference table defining an energy production platform, including:
a 'Basic' performance level specifying 'Basic' performance assessment criteria;
a 'Progressive' performance level specifying 'Progressive' performance assessment criteria;
a 'Leading' performance level specifying 'Leading' performance assessment criteria;
an 'Emerging' performance level specifying 'Emerging' performance assessment criteria;

establishing production operation management assessment criteria corresponding to the energy production platform,
wherein the 'Basic' performance assessment criteria includes a first criteria where a proactive approach to production management does not exist;
wherein the 'Progressive' performance assessment criteria includes a first criteria where limited efforts are made towards the identification of production losses and possible threats;
wherein the 'Leading' performance assessment criteria includes a first criteria where production losses and possible threats are identified and action plans are implemented and effectively tracked;
wherein the 'Emerging' performance assessment criteria includes a first criteria where production losses, possible threats and opportunities to improve production are identified;

receiving, by the processor, an input specifying an energy industry area, an energy industry key assessment area, and current capabilities corresponding to an energy business under examination, for analysis;

searching, by the processor, the multidimensional energy industry performance reference set for a matching key assessment performance reference table that matches the energy industry area and the energy industry key assessment area;

retrieving, by the processor, the matching key assessment performance reference table;

analyzing by the processor, the retrieved matching key assessment performance reference table, the analysis including comparing the current capabilities received as input, to the first criteria of each of the Basic performance assessment criteria, the Progressive performance assessment criteria, the Leading performance assessment criteria, and the Emerging performance assessment criteria; and obtaining, by the processor, a resultant performance level for the energy industry key assessment area, wherein the resultant performance level corresponds to a position along a scale of mastery that includes the Basic performance level, the Progressive performance level, the Leading performance level, and the Emerging performance level.

8. The non-transitory computer-readable medium of claim 7,
wherein the 'Basic' performance assessment criteria includes:
a second criteria: Only corrective actions are implemented;
wherein the 'Progressive' performance assessment criteria includes:
a second criteria: There is no effective control of the implementation of action plans;
wherein the 'Leading' performance assessment criteria includes:
a second criteria: No substantial efforts are made towards the identification of opportunities that could improve production;
wherein the 'Emerging' performance assessment criteria includes:
a second criteria: Action plans are implemented and effectively tracked to optimize production.

9. A non-transitory computer-readable medium encoded with data representing a computer program for a high-performance capability assessment of an energy industry, the computer-readable memory causing the computer to perform the acts of:
providing a processor operatively coupled to a communication network;
providing one or more databases operatively coupled to the processor and accessible through the communication network;
coupling an interface to the processor for receiving input;
defining, by the processor coupled to a machine-readable memory, in said one or more databases, a multidimensional energy industry performance reference set further comprising multiple key assessment performance reference tables, at least one key assessment performance reference table defining an energy production platform, including:
a 'Basic' performance level specifying 'Basic' performance assessment criteria;
a 'Progressive' performance level specifying 'Progressive' performance assessment criteria;
a 'Leading' performance level specifying 'Leading' performance assessment criteria;
an 'Emerging' performance level specifying 'Emerging' performance assessment criteria;
establishing maintenance management assessment criteria corresponding to the energy production platform,
wherein the 'Basic' performance assessment criteria includes a first criteria where no predictive and preventive maintenance plans;
wherein the 'Progressive' performance assessment criteria includes a first criteria where predictive and preventive maintenance plans are approved;
wherein the 'Leading' performance assessment criteria includes a first criteria where predictive and preventive maintenance plans are approved and processes are formally documented and used by all teams involved;
wherein the 'Emerging' performance assessment criteria includes a first criteria where predictive and preventive maintenance plans are approved and processes are formally documented and used by all teams involved;

receiving, by the processor, an input specifying an energy industry area, an energy industry key assessment area, and current capabilities corresponding to an energy business under examination, for analysis;
searching, by the processor, the multidimensional energy industry performance reference set for a matching key assessment performance reference table that matches the energy industry area and the energy industry key assessment area;
retrieving, by the processor, the matching key assessment performance reference table;
analyzing by the processor, the retrieved matching key assessment performance reference table, the analysis including comparing the current capabilities received as input, to the first criteria of each of the Basic performance assessment criteria, the Progressive performance assessment criteria, the Leading performance assessment criteria, and the Emerging performance assessment criteria; and
obtaining, by the processor, a resultant performance level for the energy industry key assessment area, wherein the resultant performance level corresponds to a position along a scale of mastery that includes the Basic performance level, the Progressive performance level, the Leading performance level, and the Emerging performance level.

10. A non-transitory computer-readable medium encoded with data representing a computer program for a high-performance capability assessment of an energy industry, the computer-readable memory causing the computer to perform the acts of:
providing a processor operatively coupled to a communication network;
providing one or more databases operatively coupled to the processor and accessible through the communication network;
coupling an interface to the processor for receiving input;
defining, by the processor coupled to a machine-readable memory, in said one or more databases, a multidimensional energy industry performance reference set further comprising multiple key assessment performance reference tables, at least one key assessment performance reference table defining an energy production platform, including:
a 'Basic' performance level specifying 'Basic' performance assessment criteria;
a 'Progressive' performance level specifying 'Progressive' performance assessment criteria;
a 'Leading' performance level specifying 'Leading' performance assessment criteria;
an 'Emerging' performance level specifying 'Emerging' performance assessment criteria;
establishing maintenance management assessment criteria corresponding to the energy production platform,
wherein the 'Basic' performance assessment criteria includes a first criteria where each area has its own schedule; there is not an established process to perform activities prioritization;

wherein the 'Progressive' performance assessment criteria includes a first criteria where each area has its own schedule and there is not an established process to perform activities prioritization;

wherein the 'Leading' performance assessment criteria includes a first criteria where field activities are integrated in a single schedule and there is an established process to perform activities prioritization;

wherein the 'Emerging' performance assessment criteria includes a first criteria where field activities are integrated in a single schedule, which is available for all areas involved, and there is an established process to perform activities prioritization;

receiving, by the processor, an input specifying an energy industry area, an energy industry key assessment area, and current capabilities corresponding to an energy business under examination, for analysis;

searching, by the processor, the multidimensional energy industry performance reference set for a matching key assessment performance reference table that matches the energy industry area and the energy industry key assessment area;

retrieving, by the processor, the matching key assessment performance reference table;

analyzing by the processor, the retrieved matching key assessment performance reference table, the analysis including comparing the current capabilities received as input, to the first criteria of each of the Basic performance assessment criteria, the Progressive performance assessment criteria, the Leading performance assessment criteria, and the Emerging performance assessment criteria; and obtaining, by the processor, a resultant performance level for the energy industry key assessment area, wherein the resultant performance level corresponds to a position along a scale of mastery that includes the Basic performance level, the Progressive performance level, the Leading performance level, and the Emerging performance level.

11. The non-transitory computer-readable medium of claim 7 further comprising computer-readable content to cause a computer to perform acts of establishing reservoir management assessment criteria, wherein the 'Basic' performance assessment criteria includes:
a second criteria: No efforts are made towards improvement of information sharing;
a third criteria: Proactive reservoir management does not exist;

wherein the 'Progressive' performance assessment criteria includes:
a second criteria: Efforts are made towards improved information sharing;

wherein the 'Leading' performance assessment criteria includes:
a second criteria: Efforts are made towards proactive reservoir management;
a third criteria: Information is still not timely provided;

wherein the 'Emerging' performance assessment criteria includes:
a second criteria: Proactive reservoir management is allowed through real-time reservoir surveillance which enables the teams to timely observe changes in the reservoir and, therefore, anticipate and mitigate production loss.

12. The non-transitory computer-readable medium of claim 7 further comprising computer-readable content to cause a computer to perform acts of establishing reservoir management assessment criteria, wherein the 'Basic' performance assessment criteria includes:
a second criteria: Reservoir Engineering does not monitor Production activities and variances to plan on a regular basis;

wherein the 'Progressive' performance assessment criteria includes:
a second criteria: Reservoir Engineering does not monitor Production activities and variances to plan on a regular basis;

wherein the 'Leading' performance assessment criteria includes:
a second criteria: Reservoir Engineering does not monitor Production activities and variances to plan on a regular basis;

wherein the 'Emerging' performance assessment criteria includes:
a second criteria: Reservoir Engineering monitors Production activities and variances to plan on a regular basis.

13. A system for high-performance capability assessment of an energy business, comprising:

a processor operatively coupled to a communication network;

an interface coupled to the processor and configured to receive input;

one or more databases operatively coupled to the processor and accessible through the communication network;

a machine-readable memory operatively located in said one or more databases, said memory including a multidimensional energy industry performance reference set comprising multiple key assessment performance reference tables, at least one key assessment performance reference table defining an energy production platform, including:
a 'Basic' performance level specifying 'Basic' performance assessment criteria;
a 'Progressive' performance level specifying 'Progressive' performance assessment criteria;
a 'Leading' performance level specifying 'Leading' performance assessment criteria;
an 'Emerging' performance level specifying 'Emerging' performance assessment criteria;

the processor establishing production operation management assessment criteria corresponding to the energy production platform,
wherein the 'Basic' performance assessment criteria includes a first criteria where a proactive approach to production management does not exist;
wherein the 'Progressive' performance assessment criteria includes a first criteria where limited efforts are made towards the identification of production losses and possible threats;
wherein the 'Leading' performance assessment criteria includes a first criteria where production losses and possible threats are identified and action plans are implemented and effectively tracked;
wherein the 'Emerging' performance assessment criteria includes a first criteria where production losses, possible threats and opportunities to improve production are identified;

the interface receiving an input specifying an energy industry area, an energy industry key assessment area, and current capabilities corresponding to an energy business under examination, for analysis;

wherein the processor searches the multidimensional energy industry performance reference set for a matching key assessment performance reference table that matches the energy industry area and the energy industry key assessment area, and retrieves the matching key assessment performance reference table;

wherein the processor performs analysis of the matching key assessment performance reference table, the analysis including comparing the current capabilities received as input, to the first criteria of each of the Basic performance assessment criteria, the Progressive performance assessment criteria, the Leading performance assessment criteria, and the Emerging performance assessment criteria; and obtains a resultant performance level for the energy industry key assessment area, wherein the resultant performance level corresponds to a position along a scale of mastery that includes the Basic performance level, the Progressive performance level, the Leading performance level, and the Emerging performance level.

14. The system of claim 13,
wherein the 'Basic' performance assessment criteria includes:
a second criteria: Only corrective actions are implemented;
wherein the 'Progressive' performance assessment criteria includes:
a second criteria: There is no effective control of the implementation of action plans;
wherein the 'Leading' performance assessment criteria includes:
a second criteria: No substantial efforts are made towards the identification of opportunities that could improve production;
wherein the 'Emerging' performance assessment criteria includes:
a second criteria: Action plans are implemented and effectively tracked to optimize production.

15. A system for high-performance capability assessment of an energy business, comprising:
a processor operatively coupled to a communication network;
an interface coupled to the processor and configured to receive input;
one or more databases operatively coupled to the processor and accessible through the communication network;
a machine-readable memory operatively located in said one or more databases, said memory including a multidimensional energy industry performance reference set comprising multiple key assessment performance reference tables, at least one key assessment performance reference table defining an energy production platform, including:
a 'Basic' performance level specifying 'Basic' performance assessment criteria;
a 'Progressive' performance level specifying 'Progressive' performance assessment criteria;
a 'Leading' performance level specifying 'Leading' performance assessment criteria;
an 'Emerging' performance level specifying 'Emerging' performance assessment criteria;
the processor establishes maintenance management criteria corresponding to the energy production platform,
wherein the 'Basic' performance assessment criteria includes a first criteria where no predictive and preventive maintenance plans;

wherein the 'Progressive' performance assessment criteria includes a first criteria where predictive and preventive maintenance plans are approved;
wherein the 'Leading' performance assessment criteria includes a first criteria where predictive and preventive maintenance plans are approved and processes are formally documented and used by all teams involved;
wherein the 'Emerging' performance assessment criteria includes a first criteria where predictive and preventive maintenance plans are approved and processes are formally documented and used by all teams involved;
the interface receiving an input specifying an energy industry area, an energy industry key assessment area, and current capabilities corresponding to an energy business under examination, for analysis;
wherein the processor searches the multidimensional energy industry performance reference set for a matching key assessment performance reference table that matches the energy industry area and the energy industry key assessment area, and retrieves the matching key assessment performance reference table;
wherein the processor performs analysis of the matching key assessment performance reference table, the analysis including comparing the current capabilities received through the interface to the first criteria of each of the Basic performance assessment criteria, the Progressive performance assessment criteria, the Leading performance assessment criteria, and the Emerging performance assessment criteria, and obtains a resultant performance level for the energy industry key assessment area; and
wherein the resultant performance level corresponds to a position along a scale of mastery that includes the Basic performance level, the Progressive performance level, the Leading performance level, and the Emerging performance level.

16. A system for high-performance capability assessment of an energy business, comprising:
a processor operatively coupled to a communication network;
an interface coupled to the processor and configured to receive input;
one or more databases operatively coupled to the processor and accessible through the communication network;
a machine-readable memory operatively located in said one or more databases, said memory including a multidimensional energy industry performance reference set comprising multiple key assessment performance reference tables, at least one key assessment performance reference table defining an energy production platform, including:
a 'Basic' performance level specifying 'Basic' performance assessment criteria;
a 'Progressive' performance level specifying 'Progressive' performance assessment criteria;
a 'Leading' performance level specifying 'Leading' performance assessment criteria;
an 'Emerging' performance level specifying 'Emerging' performance assessment criteria;
the processor establishes maintenance management criteria corresponding to the energy production platform,
wherein the 'Basic' performance assessment criteria includes a first criteria where each area has its own schedule; there is not an established process to perform activities prioritization;

wherein the 'Progressive' performance assessment criteria includes a first criteria where each area has its own schedule and there is not an established process to perform activities prioritization;

wherein the 'Leading' performance assessment criteria includes a first criteria where field activities are integrated in a single schedule and there is an established process to perform activities prioritization;

wherein the 'Emerging' performance assessment criteria includes a first criteria where field activities are integrated in a single schedule, which is available for all areas involved, and there is an established process to perform activities prioritization;

the interface receiving an input specifying an energy industry area, an energy industry key assessment area, and current capabilities corresponding to an energy business under examination, for analysis;

wherein the processor searches the multidimensional energy industry performance reference set for a matching key assessment performance reference table that matches the energy industry area and the energy industry key assessment area, and retrieves the matching key assessment performance reference table;

wherein the processor performs analysis of the matching key assessment performance reference table, the analysis including comparing the current capabilities received through the interface to the first criteria of each of the Basic performance assessment criteria, the Progressive performance assessment criteria, the Leading performance assessment criteria, and the Emerging performance assessment criteria, and obtains a resultant performance level for the energy industry key assessment area; and wherein the resultant performance level corresponds to a position along a scale of mastery that includes the Basic performance level, the Progressive performance level, the Leading performance level, and the Emerging performance level.

17. The system of claim 13, wherein the processor establishes reservoir management criteria, wherein the 'Basic' performance assessment criteria includes:

a second criteria: No efforts are made towards improvement of information sharing;

a third criteria: Proactive reservoir management does not exist;

wherein the 'Progressive' performance assessment criteria includes:

a second criteria: Efforts are made towards improved information sharing;

wherein the 'Leading' performance assessment criteria includes:

a second criteria: Efforts are made towards proactive reservoir management;

a third criteria: Information is still not timely provided;

wherein the 'Emerging' performance assessment criteria includes:

a second criteria: Proactive reservoir management is allowed through real-time reservoir surveillance which enables the teams to timely observe changes in the reservoir and, therefore, anticipate and mitigate production loss.

18. The system of claim 13, wherein the processor establishes reservoir management criteria, wherein the 'Basic' performance assessment criteria includes:

a second criteria: Reservoir Engineering does not monitor Production activities and variances to plan on a regular basis;

wherein the 'Progressive' performance assessment criteria includes:

a second criteria: Reservoir Engineering does not monitor Production activities and variances to plan on a regular basis;

wherein the 'Leading' performance assessment criteria includes:

a second criteria: Reservoir Engineering does not monitor Production activities and variances to plan on a regular basis;

wherein the 'Emerging' performance assessment criteria includes:

a second criteria: Reservoir Engineering monitors Production activities and variances to plan on a regular basis.

* * * * *

UNITED STATES PATENT AND TRADEMARK OFFICE
CERTIFICATE OF CORRECTION

PATENT NO.        : 8,880,422 B1
APPLICATION NO.   : 12/710662
DATED             : November 4, 2014
INVENTOR(S)       : Silke Lehmann et al.

It is certified that error appears in the above-identified patent and that said Letters Patent is hereby corrected as shown below:

In the Claims

In column 43, claim 5, line 45, before "criteria: Information is" replace "third" with --second--.

Signed and Sealed this
Thirtieth Day of June, 2015

Michelle K. Lee
*Director of the United States Patent and Trademark Office*